United States Patent
Osamura et al.

(10) Patent No.: US 12,462,838 B2
(45) Date of Patent: Nov. 4, 2025

(54) MAGNETIC RECORDING MEDIUM AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ryo Osamura, Kawasaki Kanagawa (JP); Yuji Nakagawa, Kawasaki Kanagawa (JP); Tomoyuki Maeda, Kawasaki Kanagawa (JP); Masayuki Takagishi, Kunitachi Tokyo (JP); Naoyuki Narita, Funabashi Chiba (JP); Kosuke Kurihara, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/436,535

(22) Filed: Feb. 8, 2024

(65) Prior Publication Data

US 2024/0339128 A1    Oct. 10, 2024

(30) Foreign Application Priority Data

Apr. 6, 2023  (JP) .................. 2023-061877

(51) Int. Cl.
 *G11B 5/66* (2006.01)
 *G11B 5/65* (2006.01)
(52) U.S. Cl.
 CPC ............. *G11B 5/672* (2021.05); *G11B 5/656* (2013.01); *G11B 2220/235* (2013.01)
(58) Field of Classification Search
 None
 See application file for complete search history.

(56) References Cited

U.S. PATENT DOCUMENTS 5,815,343 A * 9/1998 Ishikawa ............. G11B 5/7373
8,940,418 B1 * 1/2015 van Ek ................. G11B 5/672
                                                        428/828.1

(Continued)

FOREIGN PATENT DOCUMENTS

CN          102810320 A * 12/2012  ............. G11B 5/672

OTHER PUBLICATIONS

X. Bai and J.-G. Zhu, "Effective Field Analysis of Segmented Media for Microwave-Assisted Magnetic Recording," in IEEE Magnetics Letters, vol. 8, pp. 1-4, 2017.

(Continued)

*Primary Examiner* — William J Klimowicz
(74) *Attorney, Agent, or Firm* — Knobbe, Martens, Olson & Bear, LLP

(57) ABSTRACT

According to one embodiment, a magnetic recording medium includes a first magnetic region, a second magnetic region, a third magnetic region, a fourth magnetic region, and a fifth magnetic region. The second magnetic region is provided between the fifth magnetic region and the first magnetic region in a first direction from the fifth magnetic region to the first magnetic region. The third magnetic region is provided between the fifth magnetic region and the second magnetic region in the first direction. The fourth magnetic region is provided between the fifth magnetic region and the third magnetic region in the first direction. A first composition ratio of a first Pt atomic concentration to a first Co atomic concentration in the first magnetic region is higher than a second composition ratio of a second Pt atomic concentration to a second Co atomic concentration in the second magnetic region.

20 Claims, 14 Drawing Sheets

(56) References Cited

U.S. PATENT DOCUMENTS

| | | | |
|---|---|---|---|
| 9,142,240 B2* | 9/2015 | Nolan | G11B 5/82 |
| 2002/0015864 A1* | 2/2002 | Maesaka | G11B 5/7377 |
| 2003/0104247 A1* | 6/2003 | Girt | G11B 5/678 |
| | | | 428/828 |
| 2005/0053805 A1* | 3/2005 | Hinoue | G11B 5/672 |
| | | | 428/828.1 |
| 2005/0202285 A1* | 9/2005 | Kawada | G11B 5/7369 |
| | | | 428/827 |
| 2006/0057429 A1* | 3/2006 | Hinoue | G11B 5/672 |
| | | | 428/829 |
| 2009/0073599 A1* | 3/2009 | Nemoto | G11B 5/672 |
| | | | 360/77.02 |
| 2009/0202866 A1* | 8/2009 | Kim | G11B 5/7364 |
| | | | 428/833.1 |
| 2011/0003175 A1* | 1/2011 | Valcu | G11B 5/678 |
| | | | 427/127 |
| 2013/0083428 A1* | 4/2013 | Kaizu | G11B 5/3146 |
| 2015/0103440 A1* | 4/2015 | Oikawa | G11B 5/7377 |
| | | | 428/828 |
| 2016/0267935 A1* | 9/2016 | Ikeda | G11B 5/672 |
| 2017/0221515 A1* | 8/2017 | Inoue | G11B 5/678 |
| 2018/0197570 A1* | 7/2018 | Ikeda | G11B 5/678 |
| 2019/0051322 A1* | 2/2019 | Koizumi | G11B 5/3143 |
| 2021/0151076 A1* | 5/2021 | Tang | G11B 5/667 |
| 2024/0185884 A1* | 6/2024 | Osamura | G11B 5/84 |

OTHER PUBLICATIONS

T. Tanaka, et al., "MAMR Writability and Signal-Recording Characteristics on Granular Exchange-Coupled Composite Media", pp. 1-5, 2021.

T. Tanaka, K. Kurihara, X. Ya, X. Bai, and Y. Kanai, "Micromagnetic Simulation of Microwave-Assisted Magnetization Switching and Signal Recording Characteristics for Exchange-Coupled Composite Media With Layer Anisotropy Structure", Journal of Magnetism and Magnetic Materials, vol. 587, pp. 1-8, 2023.

* cited by examiner

MAGNETIC RECORDING MEDIUM AND MAGNETIC RECORDING DEVICE

CROSS-REFERENCE TO RELATED APPLICATIONS

This application is based upon and claims the benefit of priority from Japanese Patent Application No. 2023-061877, filed on Apr. 6, 2023; the entire contents of which are incorporated herein by reference.

FIELD

Embodiments described herein relate generally to a magnetic recording medium and a magnetic recording device.

BACKGROUND

Information is recorded on a magnetic recording medium such as an HDD (Hard Disk Drive) using a magnetic head. In magnetic recording media, it is desired to improve the recording density.

DETAILED DESCRIPTION

Figure 1:
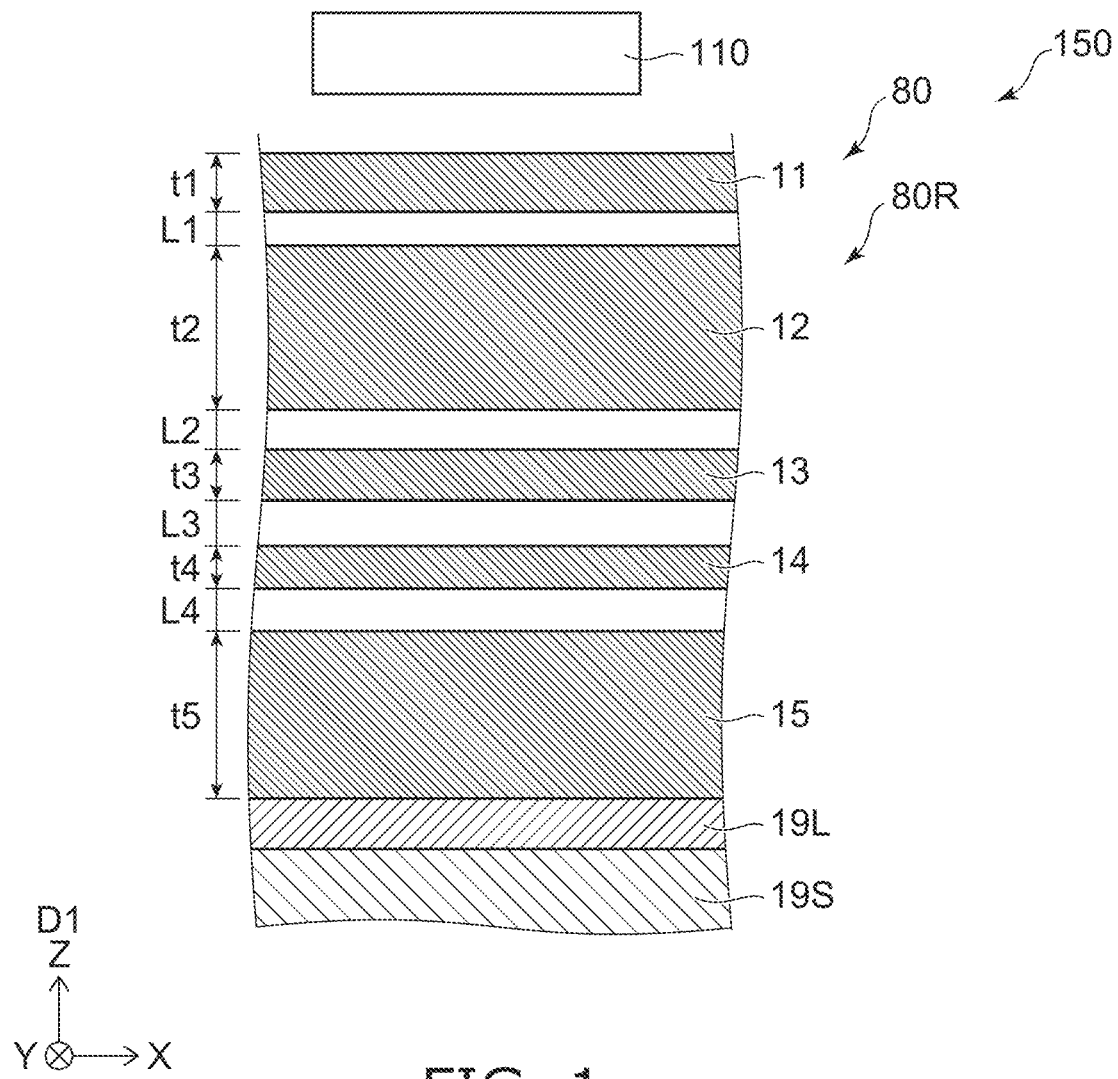
FIG. 1 is a schematic cross-sectional view illustrating a magnetic recording medium according to a first embodiment.

According to one embodiment, a magnetic recording medium includes a first magnetic region, a second magnetic region, a third magnetic region, a fourth magnetic region, and a fifth magnetic region. The second magnetic region is provided between the fifth magnetic region and the first magnetic region in a first direction from the fifth magnetic region to the first magnetic region. The third magnetic region is provided between the fifth magnetic region and the second magnetic region in the first direction. The fourth magnetic region is provided between the fifth magnetic region and the third magnetic region in the first direction. A first composition ratio of a first Pt atomic concentration in the first magnetic region to a first Co atomic concentration in the first magnetic region is higher than a second composition ratio of a second Pt atomic concentration in the second magnetic region to a second Co atomic concentration in the second magnetic region. A third composition ratio of the third Pt atomic concentration in the third magnetic region to the third Co atomic concentration in the third magnetic region is higher than the second composition ratio, and higher than a fourth composition ratio of a fourth Pt atomic concentration in the fourth magnetic region to a fourth Co atomic concentration in the fourth magnetic region. A fifth composition ratio of a fifth Pt atomic concentration in the fifth magnetic region to a fifth Co atomic concentration in the fifth magnetic region is higher than the fourth composition ratio.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic recording medium according to a first embodiment.

As shown in FIG. 1, a magnetic recording medium 80 according to the embodiment is used together with a magnetic head 110. The magnetic recording medium 80 and the magnetic head 110 are included in a magnetic recording device 150. The magnetic head 110 controls the magnetization of the magnetic recording medium 80. As a result, information is recorded on the magnetic recording medium 80. The magnetic head 110 may be configured to reproduce the recorded information.

As shown in FIG. 1, the magnetic recording medium 80 includes a first magnetic region 11, a second magnetic region 12, a third magnetic region 13, a fourth magnetic region 14, and a fifth magnetic region 15. The first magnetic region 11, the second magnetic region 12, the third magnetic region 13, the fourth magnetic region 14, and the fifth magnetic region 15 are included in the recording layer 80R.

The second magnetic region 12 is located between the fifth magnetic region 15 and the first magnetic region 11 in a first direction D1 from the fifth magnetic region 15 to the first magnetic region 11. The third magnetic region 13 is located between the fifth magnetic region 15 and the second magnetic region 12 in the first direction D1. The fourth magnetic region 14 is located between the fifth magnetic region 15 and the third magnetic region 13 in the first direction D1.

The first direction D1 is defined as a Z-axis direction. One direction perpendicular to the Z-axis direction is defined as an X-axis direction. A direction perpendicular to the Z-axis direction and the X-axis direction is defined as a Y-axis direction. The first magnetic region 11, the second magnetic region 12, the third magnetic region 13, the fourth magnetic region 14, and the fifth magnetic region 15 are substantially parallel to the X-Y plane. These regions are layered.

For example, the magnetization of the first magnetic region 11, the magnetization of the second magnetic region 12, the magnetization of the third magnetic region 13, the magnetization of the fourth magnetic region 14, and the magnetization of the fifth magnetic region 15 are along the first direction D1. The magnetic recording medium 80 is a perpendicular magnetization medium.

For example, the first magnetic region 11, the second magnetic region 12, the third magnetic region 13, the fourth magnetic region 14, and the fifth magnetic region 15 are granular magnetic regions. For example, high density recording is possible.

As shown in FIG. 1, the magnetic recording medium 80 may include a nonmagnetic substrate 19S and an intermediate layer 19L. The fifth magnetic region 15 is provided between the nonmagnetic substrate 19S and the first magnetic region 11. The intermediate layer 19L is provided between the nonmagnetic substrate 19S and the fifth magnetic region 15. The intermediate layer 19L is, for example, soft magnetic. The nonmagnetic substrate 19S includes, for example, at least one selected from the group consisting of $SiO_2$ (e.g., glass), Al-based alloy, ceramic, and resin. The intermediate layer 19L includes, for example, at least one selected from the group consisting of CoZrNb, CoB, CoTaZr, FeSiAl, FeTaC, CoTaC, NiFe, Fe, FeCoB, FeCoN, and FeTaN.

As shown in FIG. 1, in the embodiment, the first magnetic region 11 is located between the fifth magnetic region 15 and the magnetic head 110. The first magnetic region 11 is located between the second magnetic region 12 and the magnetic head 110.

In the embodiment, the five magnetic regions have different compositions. The composition ratios of the five magnetic regions are at least alternately different. The composition ratio in each of the five magnetic regions may be, for example, an average composition ratio. These magnetic regions include, for example, Co and Pt. The composition ratio in these magnetic regions is, for example, a ratio of the Pt atomic concentration to the Co atomic concentration.

A ratio (Pt/Co) of the first Pt atomic concentration in the first magnetic region 11 to the first Co atomic concentration in the first magnetic region 11 is defined as a first composition ratio R1. A ratio (Pt/Co) of the second Pt atomic concentration in the second magnetic region 12 to the second Co atomic concentration in the second magnetic region 12 is defined as a second composition ratio R2. A ratio (Pt/Co) of the third Pt atomic concentration in the third magnetic region 13 to the third Co atomic concentration in the third magnetic region 13 is defined as a third composition ratio R3. A ratio (Pt/Co) of the fourth Pt atom concentration in the fourth magnetic region 14 to the fourth Co atom concentration in the fourth magnetic region 14 is defined as a fourth composition ratio R4. A ratio (Pt/Co) of the fifth Pt atomic concentration in the fifth magnetic region 15 to the fifth Co atomic concentration in the fifth magnetic region 15 is defined as a fifth composition ratio R5. For example, these composition ratios change alternately.

For example, the first composition ratio R1 is higher than the second composition ratio R2. The third composition ratio R3 is higher than the second composition ratio R2. The third composition ratio R3 is higher than the fourth composition ratio R4. The fifth composition ratio R5 is higher than the fourth composition ratio R4. As will be described later, a high areal recording density can be obtained by changing the composition ratio in this manner.

As shown in FIG. 1, the magnetic head 110 faces one surface of the recording layer 80R. A recording magnetic field is applied from the magnetic head 110 to the recording layer 80R. At this time, for example, an alternating magnetic field may be applied from the magnetic head 110 to the recording layer 80R. The alternating magnetic field is, for example, a high frequency magnetic field. For example, MAMR (Microwave Assisted Magnetic Recording) may be implemented. The recording magnetic field and the alternating magnetic field applied by the magnetic head 110 pass through the first magnetic region 11 and reach the second magnetic region 12, the third magnetic region 13, the fourth magnetic region 14, and the fifth magnetic region 15. According to the embodiments, it is possible to provide a magnetic recording medium that can improve recording density.

Examples of simulation results regarding the characteristics of the magnetic recording medium 80 will be described below. In the simulation, the composition ratio in the plurality of magnetic regions, the distance between the plurality of magnetic regions, etc. are changed.

As shown in FIG. 1, a distance between the first magnetic region 11 and the second magnetic region 12 is defined as a first distance L1. A distance between the second magnetic region 12 and the third magnetic region 13 is defined as a second distance L2. A distance between the third magnetic region 13 and the fourth magnetic region 14 is defined as a third distance L3. A distance between the fourth magnetic region 14 and the fifth magnetic region 15 is defined as a fourth distance L4.

As shown in FIG. 1, a thickness of the first magnetic region 11 along the first direction D1 is defined as a first magnetic region thickness t1. A thickness of the second magnetic region 12 along the first direction D1 is defined as a second magnetic region thickness t2. A thickness of the third magnetic region 13 along the first direction D1 is defined as a third magnetic region thickness t3. A thickness of the fourth magnetic region 14 along the first direction D1 is defined as a fourth magnetic region thickness t4. A thickness of the fifth magnetic region 15 along the first direction D1 is defined as a fifth magnetic region thickness t5.

In the simulation, the first magnetic region thickness t1 is thinner than the second magnetic region thickness t2. The third magnetic region thickness t3 is thinner than the second magnetic region thickness t2. The fourth magnetic region thickness t4 is thinner than the second magnetic region thickness t2. The fifth magnetic region thickness t5 is thicker than the fourth magnetic region thickness t4. The first magnetic region thickness t1 is thinner than the fifth magnetic region thickness t5. The third magnetic region thickness t3 is thinner than the fifth magnetic region thickness t5.

The fourth magnetic region thickness t4 is thinner than the fifth magnetic region thickness t5.

By this relationship on the thicknesses, higher recording characteristics can be obtained than the case where all the magnetic regions have the same thickness. For example, the magnetization volume changes in conjunction with the thickness. The magnetization volume is the product of the saturation magnetization of the magnetic region and the volume of the magnetic region. By the different thicknesses, a change in the magnetization reversal behavior is generated. Thereby, higher recording characteristics can be obtained.

In the example of the simulation results shown below, the following thicknesses are applied:

The first magnetic region thickness t1 is 0.4 times the second magnetic region thickness t2. The first magnetic region thickness t1 is 0.3 times the fifth magnetic region thickness t5.

The third magnetic region thickness t3 is 0.2 times the second magnetic region thickness t2. The third magnetic region thickness t3 is 0.1 times the fifth magnetic region thickness t5.

The fourth magnetic region thickness t4 is 0.2 times the second magnetic region thickness t2. The fourth magnetic region thickness t4 is 0.1 times the fifth magnetic region thickness t5.

The second magnetic region thickness t2 is 0.8 times the fifth magnetic region thickness t5.

Generally, when the composition of the magnetic region changes, the anisotropic magnetic field Hk in the magnetic region changes. For example, as the composition ratio (Pt/Co) increases, the anisotropic magnetic field Hk increases. For example, the anisotropic magnetic field Hk varies substantially linearly with the atomic concentration of Pt in the magnetic region. In the following example, the simulation is performed using a change in the composition ratio (Pt/Co) as a change in the anisotropic magnetic field Hk.

Hereinafter, the anisotropic magnetic field of the first magnetic region 11 is referred to as a first anisotropic magnetic field Hk1. The anisotropic magnetic field of the second magnetic region 12 is referred to as a second anisotropic magnetic field Hk2. The anisotropic magnetic field of the third magnetic region 13 is referred to as a third anisotropic magnetic field Hk3. The anisotropic magnetic field of the fourth magnetic region 14 is referred to as a fourth anisotropic magnetic field Hk4. The anisotropic magnetic field of the fifth magnetic region 15 is referred to as a fifth anisotropic magnetic field Hk5. These anisotropic magnetic fields are linked to the composition ratio (Pt/Co) in each magnetic region.

FIGS. 2A to 2D and FIGS. 3A to 3D are graphs illustrating characteristics of magnetic recording medium.

Figure 2A:
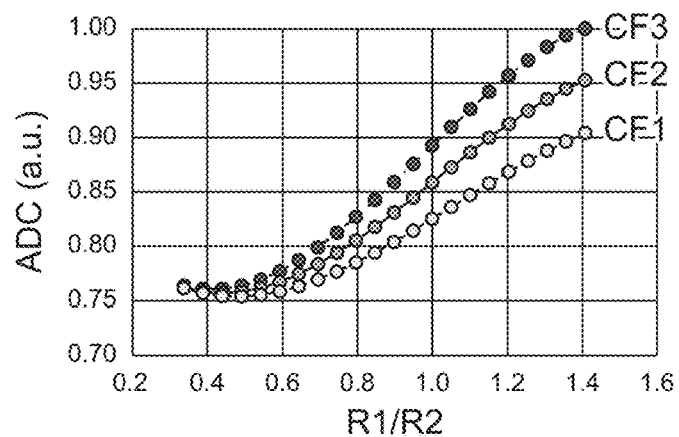
FIGS. 2A to 2D are graphs illustrating characteristics of a magnetic recording medium.
Figure 2B:
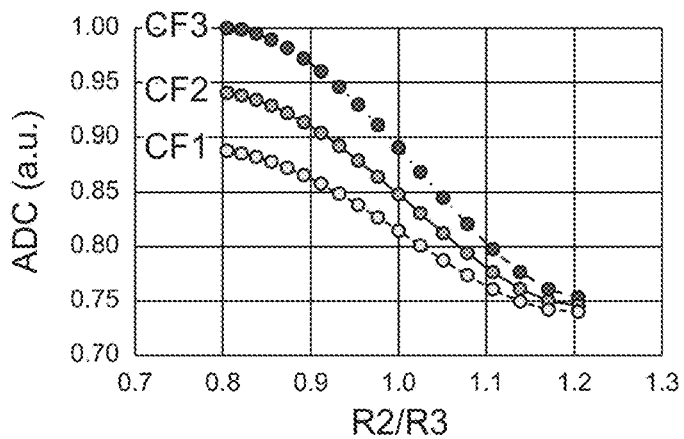
Figure 2C:
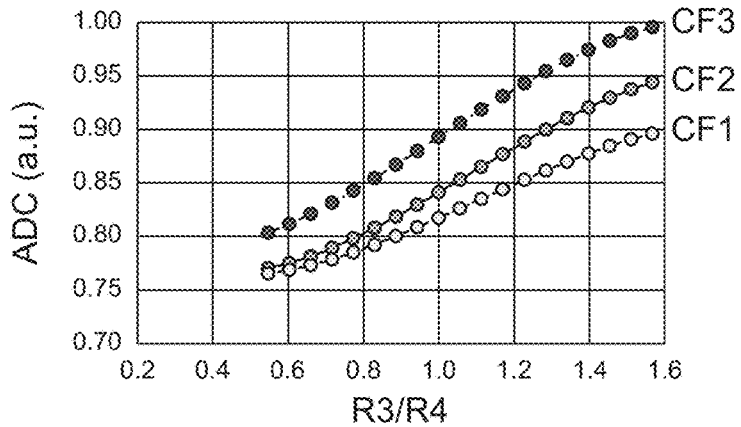
Figure 2D:
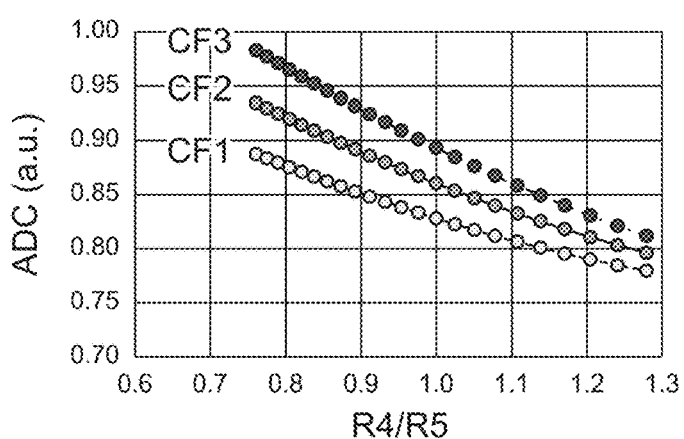
Figure 3A:
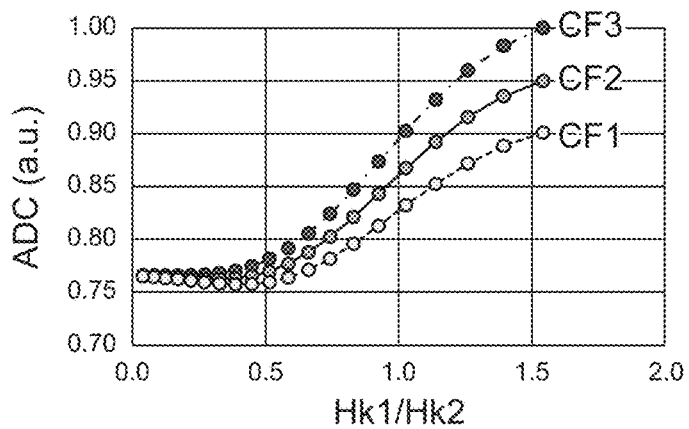
FIGS. 3A to 3D are graphs illustrating characteristics of a magnetic recording medium.
Figure 3B:
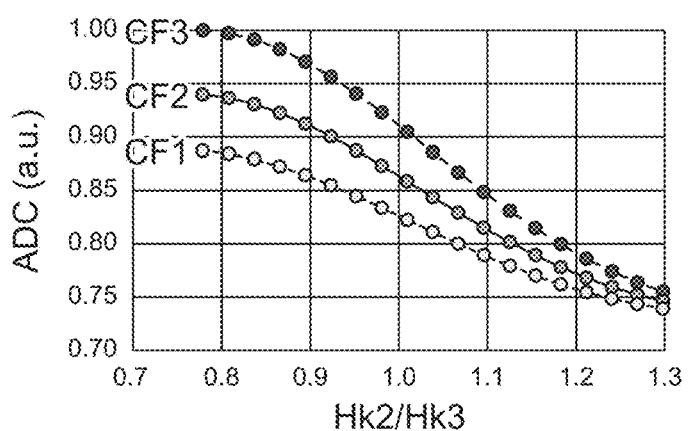
Figure 3C:
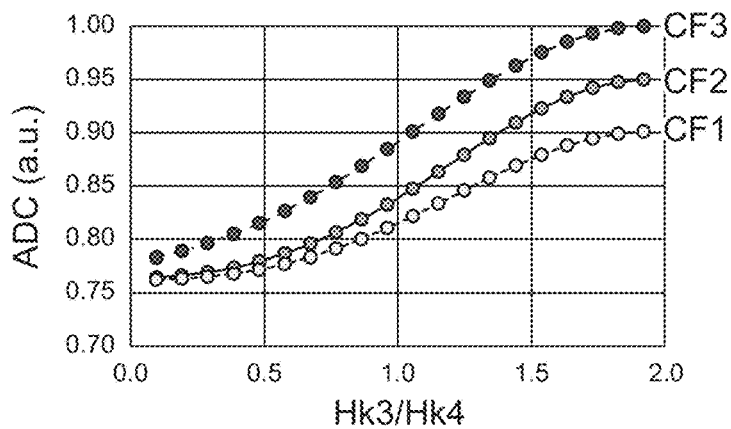
Figure 3D:
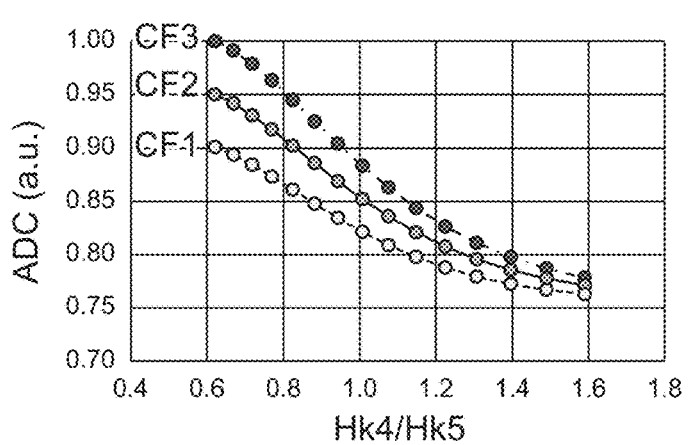

The horizontal axis in FIG. 2A is R1/R2. The horizontal axis in FIG. 2B is R2/R3. The horizontal axis in FIG. 2C is R3/R4. The horizontal axis in FIG. 2D is R4/R5. The horizontal axis in FIG. 3A is Hk1/Hk2. The horizontal axis in FIG. 3B is Hk2/Hk3. The horizontal axis in FIG. 3D is Hk3/Hk4. The horizontal axis in FIG. 3D is Hk4/Hk5. The vertical axis of these graphs is the areal recording density ADC.

These figures show, as examples, simulation results for a first configuration CF1, a second configuration CF2, and a third configuration CF3. In the first configuration CF1, L1=L2=L3=L4. In the second configuration CF2, L1/L2>2 and L3=L4. In the second configuration CF2, specifically, L1/L2 is 2.5. In the third configuration CF3, L1/L2>2, L2/L3<0.5, and 0.5<L3/L4<2. In the third configuration CF3, specifically, L1/L2 is 2.5, L2/L3 is 0.4, and L3/L4 is 1.0.

As shown in FIG. 2A, in any case of the first configuration CF1, the second configuration CF2, and the third configuration CF3, when R1/R2 is high, a high areal recording density ADC is obtained. As shown in FIG. 2B, in any case of the first configuration CF1, second configuration CF2, and third configuration CF3, when R2/R3 is low, a high areal recording density ADC is obtained. As shown in FIG. 2C, in any case of the first configuration CF1, the second configuration CF2, and the third configuration CF3, when R3/R4 is high, a high areal recording density ADC can be obtained. As shown in FIG. 2D, in any case of the first configuration CF1, the second configuration CF2, and the third configuration CF3, when R4/R5 is low, a high areal recording density ADC can be obtained.

As shown in FIG. 3A, in any case of the first configuration CF1, the second configuration CF2, and the third configuration CF3, when Hk1/Hk2 is high, a high areal recording density ADC can be obtained. As shown in FIG. 3B, in any case of the first configuration CF1, second configuration CF2, and third configuration CF3, when Hk2/Hk3 is low, a high areal recording density ADC can be obtained. As shown in FIG. 3C, in any case of the first configuration CF1, the second configuration CF2, and the third configuration CF3, when Hk3/Hk4 is high, a high areal recording density ADC can be obtained. As shown in FIG. 3D, in any case of the first configuration CF1, the second configuration CF2, and the third configuration CF3, when Hk4/Hk5 is low, a high areal recording density ADC can be obtained.

Thus, when the anisotropic magnetic fields in the first magnetic region 11, the second magnetic region 12, the third magnetic region 13, the fourth magnetic region 14, and the fifth magnetic region 15 change alternately, a high areal recording density ADC is obtained. In a region where the anisotropic magnetic field is small, magnetization reversal is easy, but thermal stability is considered to be low. On the other hand, in a region where the anisotropic magnetic field is large, magnetization reversal is difficult, but thermal stability is considered to be high. Regions having such opposite characteristics are alternately stacked. It is thought that this allows high recording characteristics to be obtained.

As shown in FIGS. 2A to 2D, in the second configuration CF2, a higher areal recording density ADC is obtained than in the first configuration CF1. In the second configuration CF2, the distance between the plurality of magnetic regions is appropriately set. Exchange coupling between the plurality of magnetic regions is appropriately weakened. As a result, it is considered that a higher areal recording density ADC can be obtained in the second configuration CF2 than in the first configuration CF1.

In the third configuration CF3, a higher areal recording density ADC than that in the second configuration CF2 is obtained. In the third configuration CF3, the distance between the plurality of magnetic regions is set more appropriately. Exchange coupling between the plurality of magnetic regions is more appropriately weakened. As a result, it is considered that a higher areal recording density ADC can be obtained in the third configuration CF3 than in the second configuration CF2.

As described with reference to FIGS. 2A to 2D, a high areal recording density ADC can be obtained when the composition ratio (Pt/Co) in the first magnetic region 11, the second magnetic region 12, the third magnetic region 13, the fourth magnetic region 14, and the fifth magnetic region 15 alternately changes. By alternately changing the composition ratio (Pt/Co), for example, the anisotropic magnetic field alternately changes. Regions having opposite characteristics are alternately stacked. As a result, high recording characteristics can be obtained.

Thus, in the embodiment, it is preferable that the first composition ratio R1 is higher than the second composition ratio R2. It is preferable that the third composition ratio R3 is higher than the second composition ratio R2. It is preferable that the third composition ratio R3 is higher than the fourth composition ratio R4. It is preferable that the fifth composition ratio R5 is higher than the fourth composition ratio R4. Thereby, a high areal recording density ADC can be obtained.

In the embodiment, it is preferable that the first anisotropic magnetic field Hk1 is larger than the second anisotropic magnetic field Hk2. It is preferable that the second anisotropic magnetic field Hk2 is smaller than the third anisotropic magnetic field Hk3. It is preferable that the third anisotropic magnetic field Hk3 is larger than the fourth anisotropic magnetic field Hk4. It is preferable that the fourth anisotropic magnetic field Hk4 is smaller than the fifth anisotropic magnetic field Hk5. Thereby, a high areal recording density ADC can be obtained.

In the embodiments, the composition ratio and the anisotropy field in each of the plurality of magnetic regions may be relatively uniform. For example, at least one of the first magnetic region 11, the second magnetic region 12, the third magnetic region 13, the fourth magnetic region 14, and the fifth magnetic region 15 may include a plurality of partial regions arranged in the first direction D1. For example, a dispersion of composition ratios in the plurality of partial regions may be 20% or less. For example, the dispersion of the anisotropic magnetic field in the plurality of partial regions may be 20% or less.

In the embodiment, it is preferable that the overall average anisotropic magnetic field of the magnetic recording medium 80 is, for example, not less than 17.5 kOe and not more than 19.5 kOe. Thereby, it becomes easy to obtain high recording characteristics, for example.

In the embodiment, it is preferable that the overall average saturation magnetization of the magnetic recording medium 80 is, for example, not less than 850 emu/cc and not more than 1050 emu/cc. Thereby, it becomes easy to obtain high recording characteristics, for example.

As mentioned above, the plurality of magnetic regions may have different thicknesses. For example, the first magnetic region thickness t1 may be not less than 0.1 times and not more than 0.5 times the second magnetic region thickness t2. The third magnetic region thickness t3 may be not less than 0.1 times and not more than 0.5 times the second magnetic region thickness t2. The fourth magnetic region thickness t4 may be not less than 0.1 times and not more than 0.5 times the second magnetic region thickness t2. The first magnetic region thickness t1 may be not less than 0.1 times and not more than 0.5 times the fifth magnetic region thickness t5. The third magnetic region thickness t3 may be not less than 0.1 times and not more than 0.5 times the fifth magnetic region thickness t5. The fourth magnetic region thickness t4 may be not less than 0.1 times and not more than 0.5 times the fifth magnetic region thickness t5. The second magnetic region thickness t2 may be not less than 0.7 times and not more than 1.3 times the fifth magnetic region thickness t5.

For example, the first magnetic region thickness t1 is not less than 0.5 nm and not more than 4.0 nm. For example, the second magnetic region thickness t2 is not less than 2.0 nm and not more than 10.0 nm. For example, the third magnetic region thickness t3 is not less than 0.5 nm and not more than 4.0 nm. For example, the fourth magnetic region thickness t4 is not less than 0.5 nm and not more than 4.0 nm. For example, the thickness t5 of the fifth magnetic region is not less than 0.5 nm and not more than 6.0 nm.

In the embodiment, the first distance L1 between the first magnetic region 11 and the second magnetic region 12 is preferably 10 nm or less. The second distance L2 between the second magnetic region 12 and the third magnetic region 13 is preferably 10 nm or less. The third distance L3 between the third magnetic region 13 and the fourth magnetic region 14 is preferably 10 nm or less. The fourth distance L4 between the fourth magnetic region 14 and the fifth magnetic region 15 is preferably 10 nm or less.

It is further preferable that the second configuration CF2 is applied, as described with respect to FIGS. 2A to 2D and FIGS. 3A to 3D. For example, the ratio of the first distance L1 to the second distance L2 is preferably higher than 2. The ratio of the third distance L3 to the fourth distance L4 may be, for example, not less than 0.8 and not more than 1.2. A high areal recording density ADC can be obtained.

It is further preferable that the third configuration CF3 is applied as described with respect to FIGS. 2A to 2D and FIGS. 3A to 3D. For example, the ratio of the first distance L1 to the second distance L2 is preferably higher than 2. The ratio of the second distance L2 to the third distance L3 is preferably lower than 0.5. The ratio of the third distance L3 to the fourth distance L4 is preferably higher than 0.5 and lower than 2. Higher areal recording density ADC can be obtained.

Figure 4:
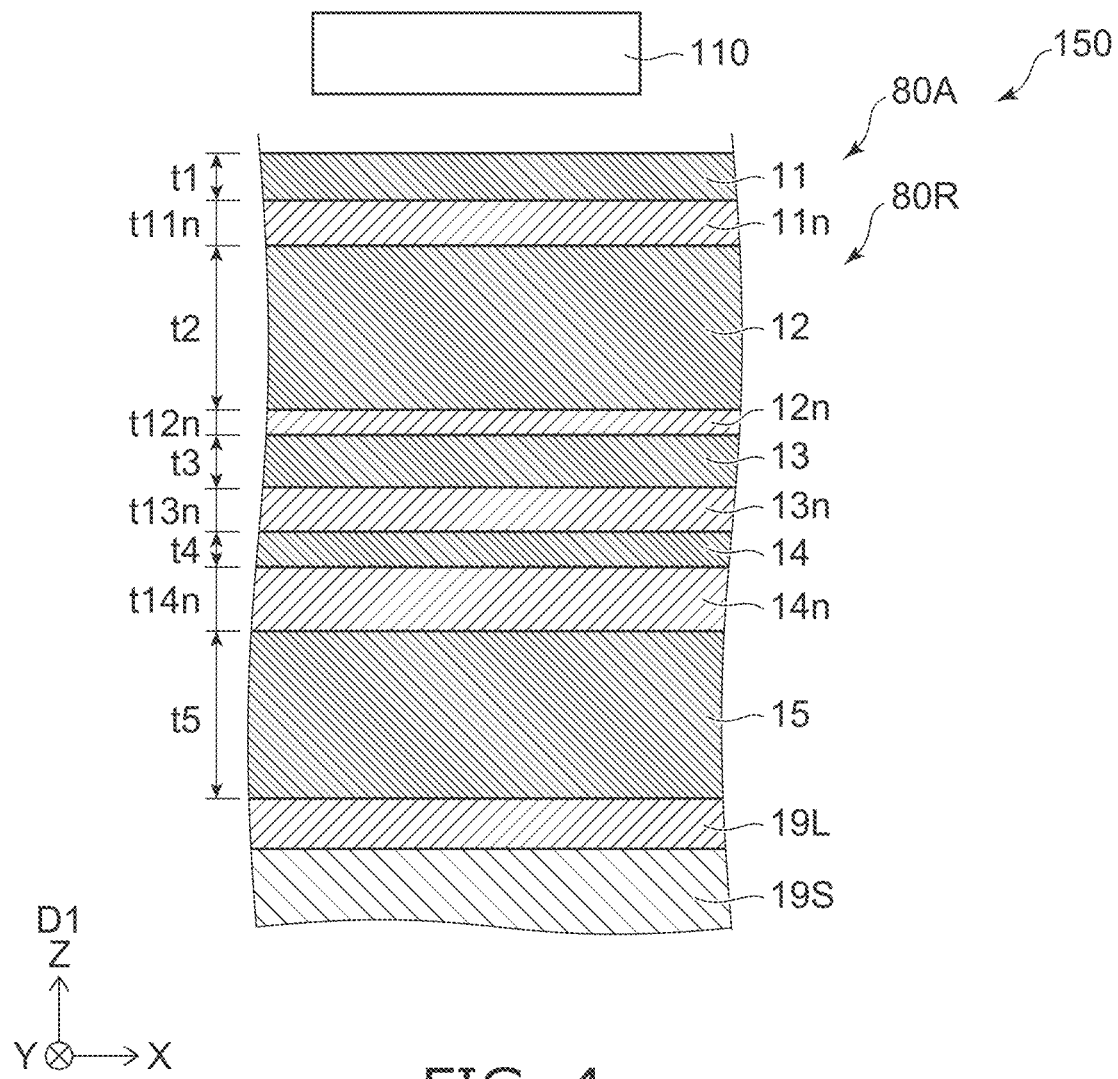
FIG. 4 is a schematic cross-sectional view illustrating a magnetic recording medium according to the first embodiment.

FIG. 4 is a schematic cross-sectional view illustrating a magnetic recording medium according to the first embodiment.

As shown in FIG. 4, in a magnetic recording medium 80A according to the embodiment, a nonmagnetic region is provided between the plurality of magnetic regions. The configuration of the magnetic recording medium 80A except for this may be the same as the configuration of the magnetic recording medium 80.

As shown in FIG. 4, the magnetic recording medium 80A includes a first nonmagnetic region 11n, a second nonmagnetic region 12n, a third nonmagnetic region 13n, and a fourth nonmagnetic region 14n. The first nonmagnetic region 11n is provided between the first magnetic region 11 and the second magnetic region 12. The second nonmagnetic region 12n is provided between the second magnetic region 12 and the third magnetic region 13. The third nonmagnetic region 13n is provided between the third magnetic region 13 and the fourth magnetic region 14. The fourth nonmagnetic region 14n is provided between the fourth magnetic region 14 and the fifth magnetic region 15.

In one example, at least one of the first nonmagnetic region 11n, the second nonmagnetic region 12n, the third nonmagnetic region 13n, or the fourth nonmagnetic region 14n includes selected from the group consisting of Ru, Pt, and C. By providing these nonmagnetic regions, magnetization reversal becomes easy.

For example, the first nonmagnetic region 11n contacts the first magnetic region 11 and the second magnetic region 12. For example, the second nonmagnetic region 12n contacts the second magnetic region 12 and the third magnetic region 13. For example, the third nonmagnetic region 13n contacts the third magnetic region 13 and the fourth magnetic region 14. For example, the fourth nonmagnetic region 14n contacts the fourth magnetic region 14 and the fifth magnetic region 15.

A thickness of the first nonmagnetic region 11n along the first direction D1 is defined as a first nonmagnetic region thickness t11n. A thickness of the second nonmagnetic region 12n along the first direction D1 is defined as a second nonmagnetic region thickness t12n. A thickness of the third nonmagnetic region 13n along the first direction D1 is defined as a third nonmagnetic region thickness t13n. A thickness of the fourth nonmagnetic region 14n along the first direction D1 is defined as a fourth nonmagnetic region thickness t14n. The thickness of these nonmagnetic regions may correspond to the distance between the plurality of magnetic regions.

For example, the first nonmagnetic region thickness t11n may be thicker than the second nonmagnetic region thickness t12n. The second nonmagnetic region thickness t12n may be thinner than the third nonmagnetic region thickness t13n.

For example, the third configuration CF3 described above may be applied. For example, the ratio (t11n/t12n) of the first nonmagnetic region thickness t11n to the second nonmagnetic region thickness t12n is preferably higher than 2. The ratio (t12n/t13n) of the second nonmagnetic region thickness t12n to the third nonmagnetic region thickness t13n is preferably lower than 0.5. The ratio (t13n/t14n) of the third nonmagnetic region thickness t13n to the fourth nonmagnetic region thickness t14n is preferably higher than 0.5 and lower than 2. For example, a high areal recording density ADC can be obtained.

Figure 5:
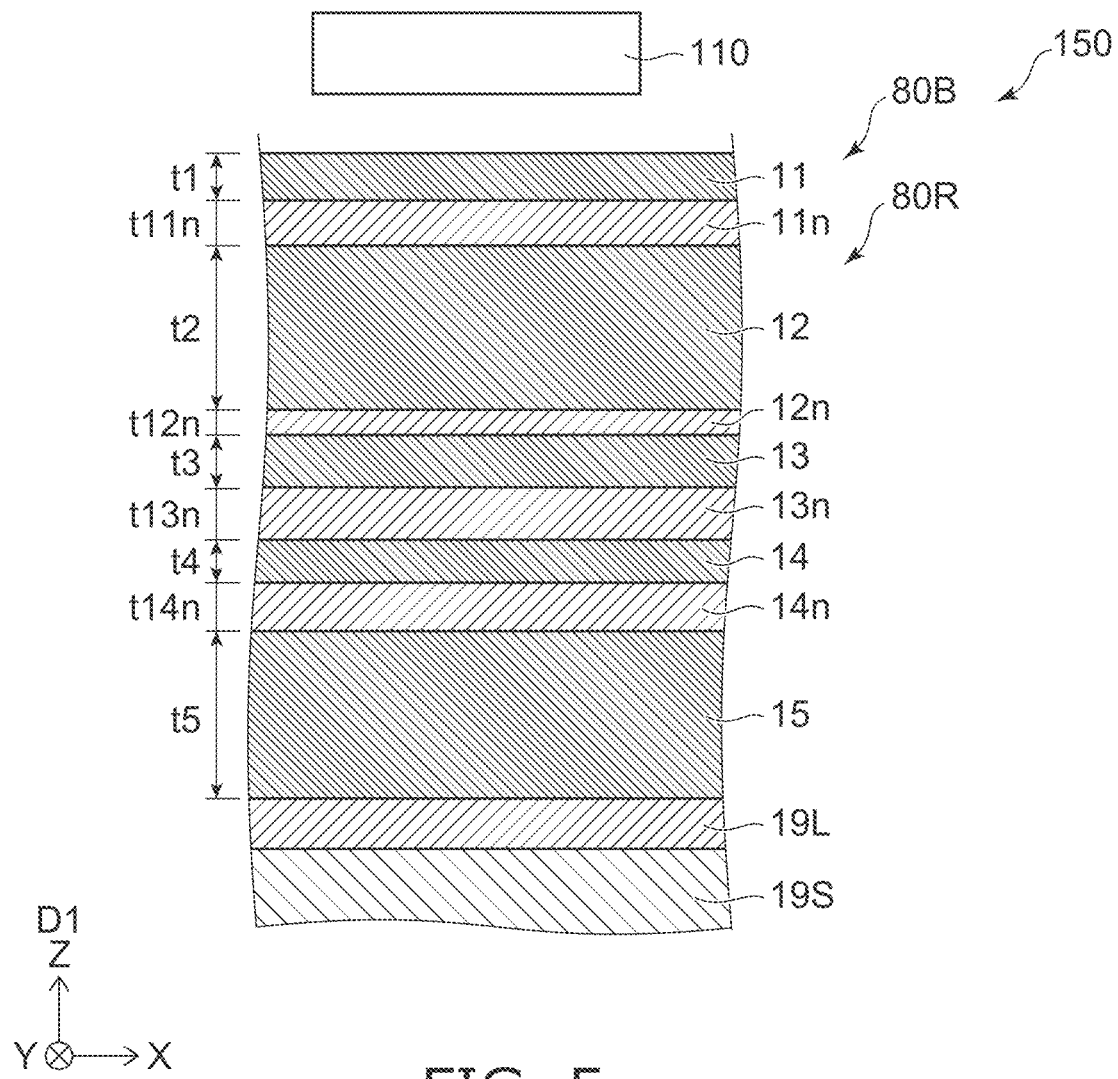
FIG. 5 is a schematic cross-sectional view illustrating a magnetic recording medium according to the first embodiment.

FIG. 5 is a schematic cross-sectional view illustrating a magnetic recording medium according to the first embodiment.

As shown in FIG. 5, in a magnetic recording medium 80B according to the embodiment, a nonmagnetic region is provided between the plurality of magnetic regions. The relationship between the thickness of the non-magnetic region in the magnetic recording medium 80B is different from the thickness of the nonmagnetic region in the magnetic recording medium 80A. The configuration of the magnetic recording medium 80B except for this may be the same as the configuration of the magnetic recording medium 80A.

The second configuration CF2 described above is applied to the magnetic recording medium 80B. For example, the first nonmagnetic region thickness t11n is thicker than the second nonmagnetic region thickness t12n. The third nonmagnetic region thickness t13n is not less than 0.8 times and not more than 1.2 times the fourth nonmagnetic region thickness t14n. For example, the ratio of the first nonmagnetic region thickness t11n to the second nonmagnetic region thickness t12n is preferably higher than 2. For example, a high areal recording density ADC can be obtained.

Figure 6:
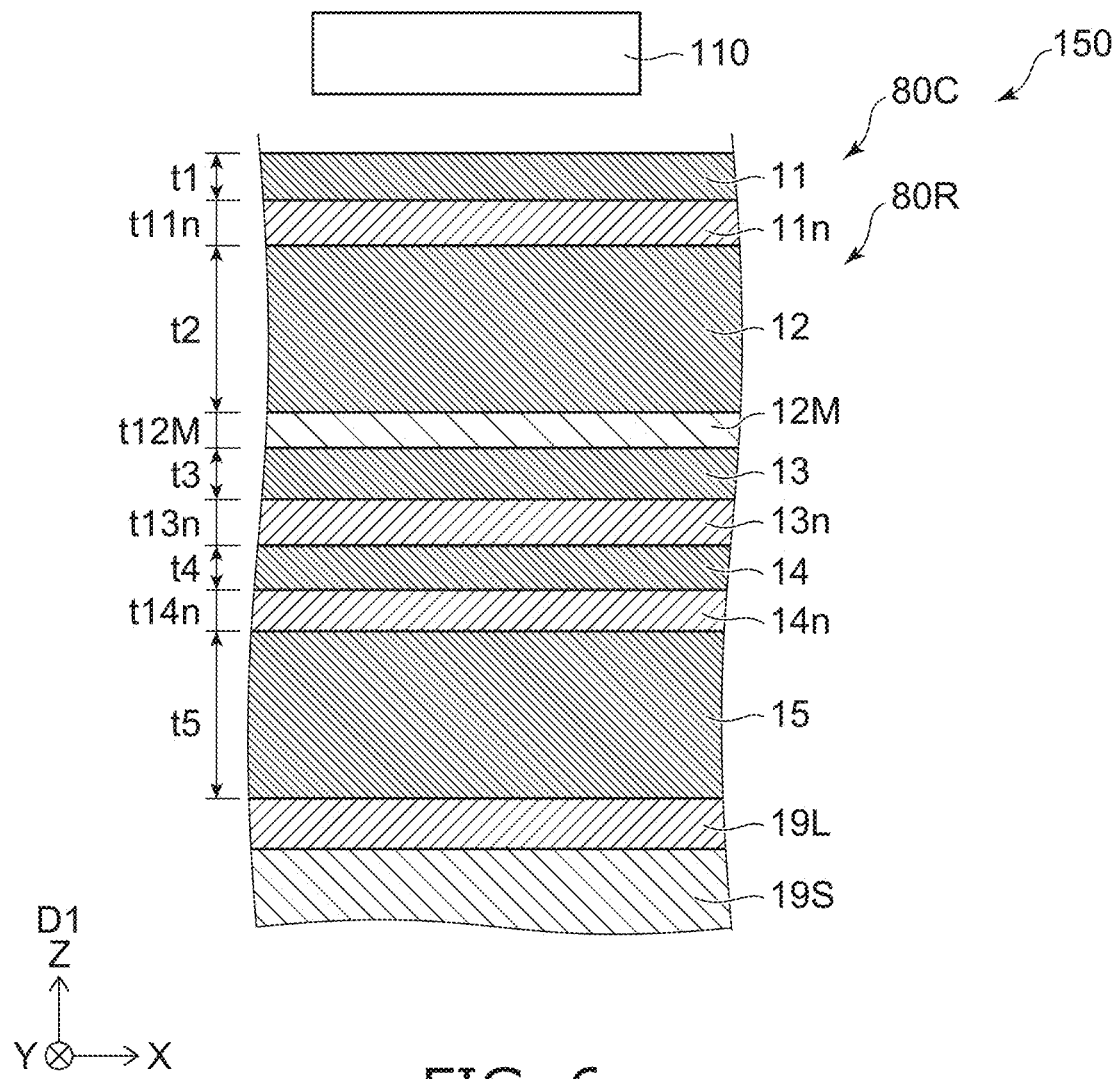
FIG. 6 is a schematic cross-sectional view illustrating a magnetic recording medium according to the first embodiment.

FIG. 6 is a schematic cross-sectional view illustrating a magnetic recording medium according to the first embodiment.

As shown in FIG. 6, a magnetic recording medium 80C according to the embodiment includes the first nonmagnetic region 11n, a second continuous magnetic region 12M, the third nonmagnetic region 13n, and the fourth nonmagnetic region 14n. The configuration of the magnetic recording medium 80C except for this may be the same as the configuration of the magnetic recording medium 80.

The first nonmagnetic region 11n is provided between the first magnetic region 11 and the second magnetic region 12. The second continuous magnetic region 12M is provided between the second magnetic region 12 and the third magnetic region 13. The third nonmagnetic region 13n is provided between the third magnetic region 13 and the fourth magnetic region 14. The fourth nonmagnetic region 14n is provided between the fourth magnetic region 14 and the fifth magnetic region 15. The second magnetic region 12 and the third magnetic region 13 are granular magnetic regions. The first magnetic region 11 and the fourth magnetic region 14 may also be granular magnetic regions.

The second continuous magnetic region 12M includes, for example, Co and at least one selected from the group consisting of Cr, Pt, and Pd. The second magnetic region 12 and the third magnetic region 13 include, for example, at least one selected from the group consisting of Cr, Pt, Si, and O, and at least one selected from the group consisting of Co and Fe. By providing the second continuous magnetic region 12M, a strong coupling between the second magnetic region 12 and the third magnetic region 13 can be maintained. Thereby, it becomes easy to obtain high recording characteristics.

For example, the second continuous magnetic region 12M does not substantially include Si. Alternatively, the concentration of Si in the second continuous magnetic region 12M is lower than the concentration of Si in the first magnetic region 11, the second magnetic region 12, the third magnetic region 13, and the fourth magnetic region 14. For example, the second continuous magnetic region 12M does not substantially include O. Alternatively, the concentration of O in the second continuous magnetic region 12M is lower than the concentration of O in the first magnetic region 11, the second magnetic region 12, the third magnetic region 13, and the fourth magnetic region 14.

In the granular magnetic region, a nonmagnetic region such as $SiO_2$ is provided between a plurality of magnetic grains including CoPtCr. Exchange coupling between the plurality of magnetic grains is weak. Thereby, the magnetization reversal becomes easy.

In the magnetic recording medium 80C, by providing the second continuous magnetic region 12M, the strong coupling between the second magnetic region 12 and the third magnetic region 13 can be maintained. This makes it easy to obtain high recording density.

A thickness of the second continuous magnetic region 12M along the first direction D1 is defined as a second continuous magnetic region thickness t12M. The second continuous magnetic region thickness t12M may be, for example, not less than 0.3 nm and not more than 3.0 nm.

Figure 7:
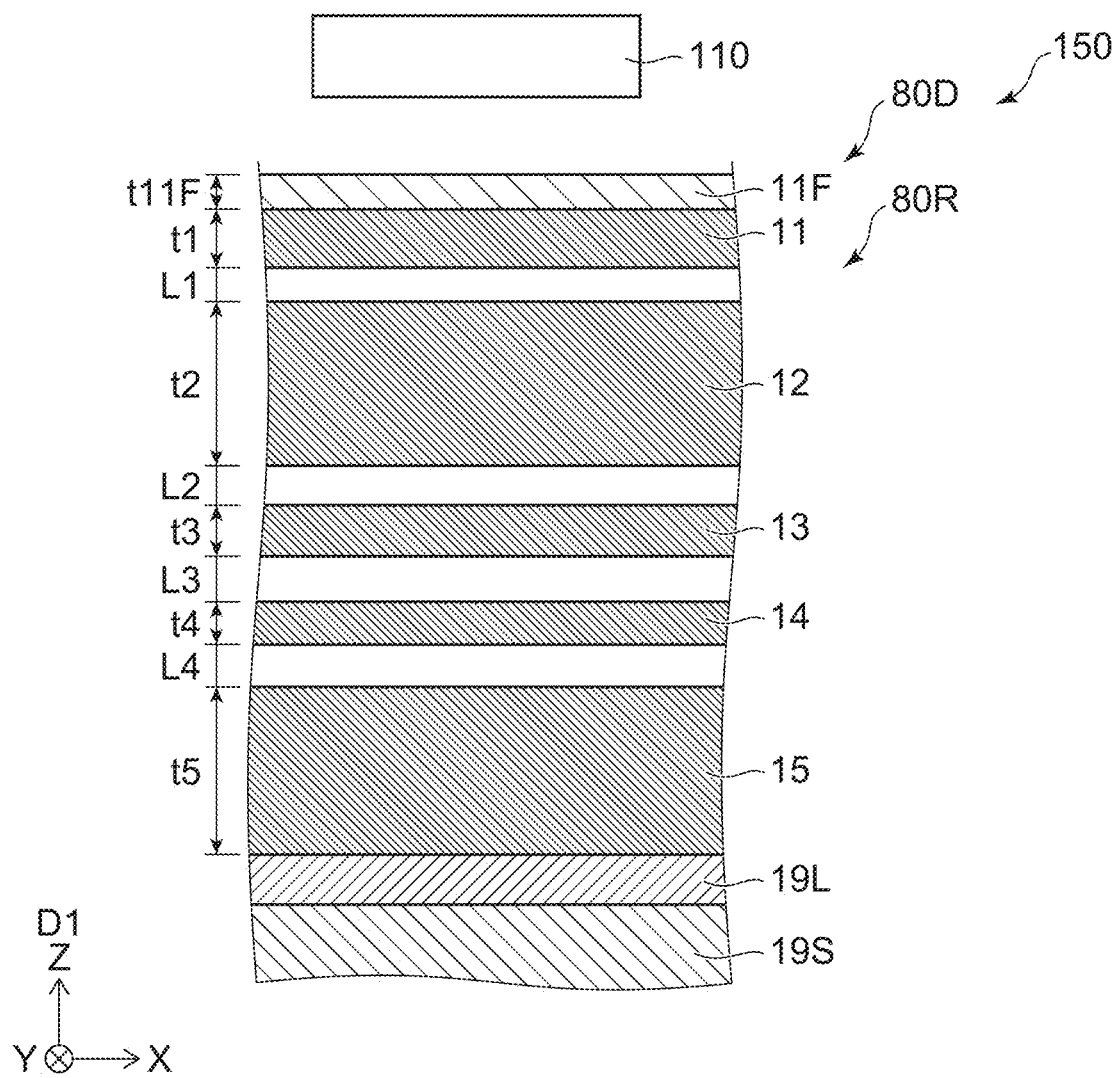
FIG. 7 is a schematic cross-sectional view illustrating a magnetic recording medium according to the first embodiment.

FIG. 7 is a schematic cross-sectional view illustrating a magnetic recording medium according to the first embodiment.

As shown in FIG. 7, a magnetic recording medium 80D according to the embodiment includes a first magnetic film 11F. The configuration of the magnetic recording medium 80D except for this may be the same as the configuration of the magnetic recording medium 80.

The first magnetic region 11 is located between the second magnetic region 12 and the first magnetic film 11F in the first direction D1. The first magnetic film 11F is located between the first magnetic region 11 and the magnetic head 110. The first magnetic film 11F is a continuous magnetic region. On the other hand, the first magnetic region 11 is a granular magnetic region. By providing the first magnetic film 11F of continuous magnetic region, it becomes easy to obtain high recording characteristics.

The first magnetic film 11F includes, for example, Co and at least one selected from the group consisting of Cr, Pt, and Pd. The mechanical strength of the first magnetic film 11F is higher than that of the first magnetic region 11. The first magnetic film 11F is, for example, a cap film (for example, a protective film). Higher stability can be obtained by providing the first magnetic film 11F.

The configurations of the magnetic recording medium 80A to 80C may be applied to the magnetic recording medium 80D.

Figure 8:
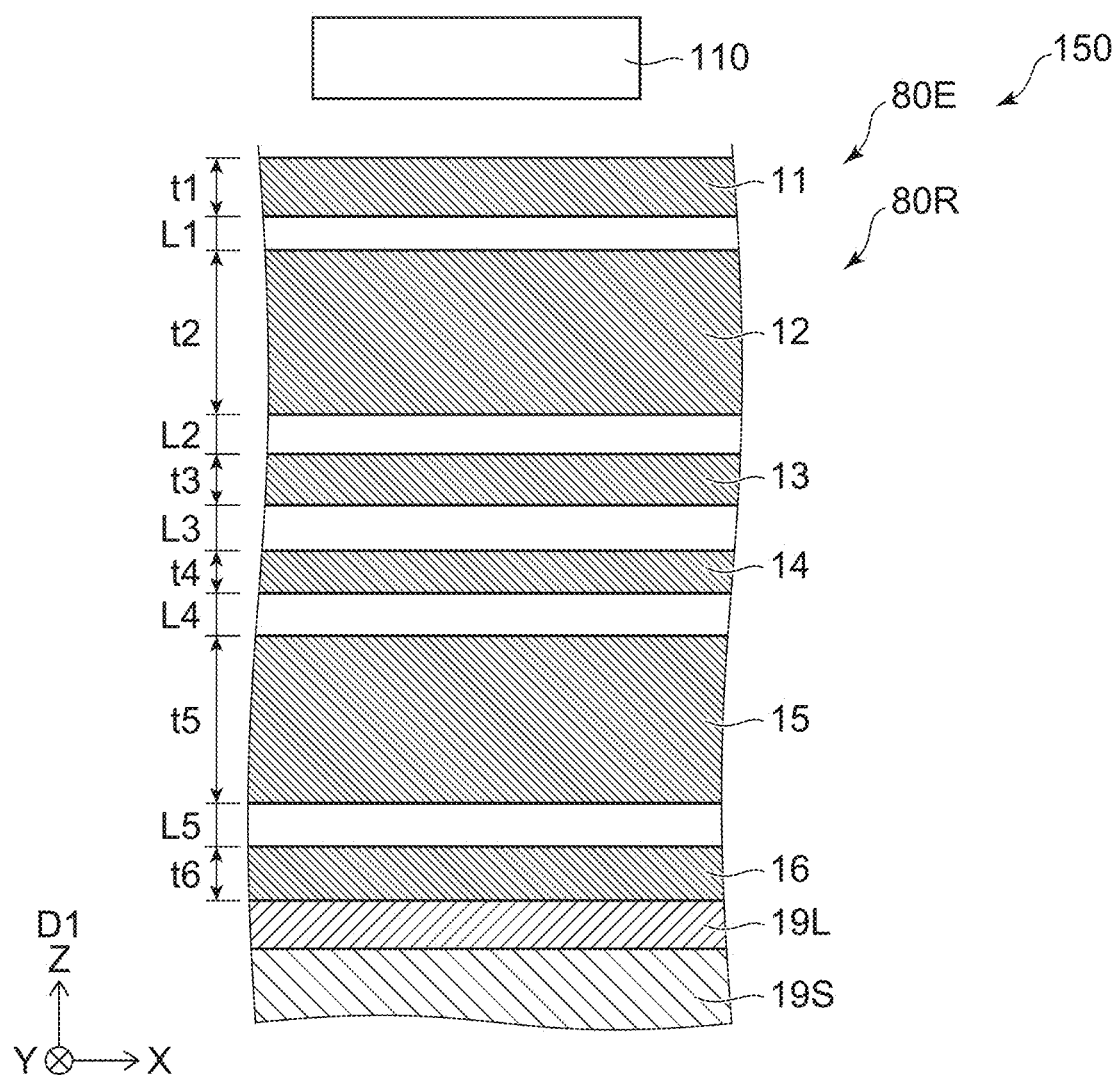
FIG. 8 is a schematic cross-sectional view illustrating a magnetic recording medium according to the first embodiment.

FIG. 8 is a schematic cross-sectional view illustrating a magnetic recording medium according to the first embodiment.

As shown in FIG. 8, a magnetic recording medium 80E according to the embodiment includes a sixth magnetic region 16. The configuration of the magnetic recording medium 80E except for this may be the same as the configuration of the magnetic recording medium 80.

In the magnetic recording medium 80E, the fifth magnetic region 15 is provided between the sixth magnetic region 16 and the fourth magnetic region 14.

A ratio (Pt/Co) of the sixth Pt atomic concentration in the sixth magnetic region 16 to the sixth Co atomic concentration in the sixth magnetic region 16 is defined as a sixth composition ratio R6. In the magnetic recording medium 80E, the sixth composition ratio R6 is lower than the fifth composition ratio R5. For example, in the plurality of magnetic regions, the composition ratio (Pt/Co) alternately increases and decreases.

An anisotropic magnetic field in the sixth magnetic region 16 is referred to as a sixth anisotropic magnetic field Hk6. For example, the sixth anisotropic magnetic field Hk6 is smaller than the fifth anisotropic magnetic field Hk5. For example, in the plurality of magnetic regions, the anisotropic magnetic field alternately increases and decreases. A high areal recording density ADC can also be obtained in the magnetic recording medium 80E.

In the magnetic recording medium 80E, a distance between the fifth magnetic region 15 and the sixth magnetic region 16 is defined as a fifth distance L5. The fifth distance L5 may be, for example, 10 nm or less.

Figure 9:
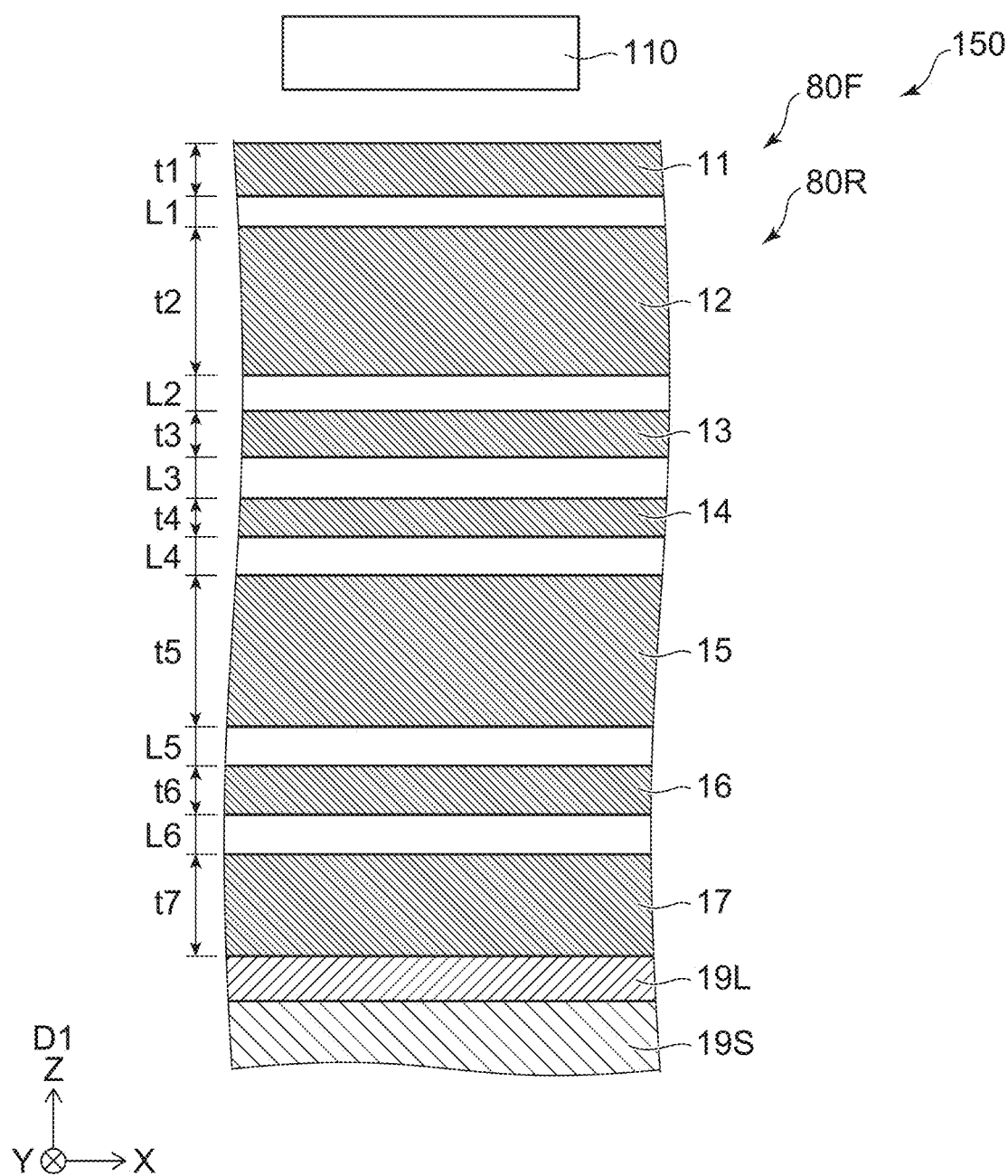
FIG. 9 is a schematic cross-sectional view illustrating a magnetic recording medium according to the first embodiment.

FIG. 9 is a schematic cross-sectional view illustrating a magnetic recording medium according to the first embodiment.

As shown in FIG. 9, a magnetic recording medium 80F according to the embodiment includes a seventh magnetic region 17. The configuration of the magnetic recording medium 80F except for this may be the same as the configuration of the magnetic recording medium 80E.

In the magnetic recording medium 80F, the fifth magnetic region 15 is provided between the seventh magnetic region 17 and the fourth magnetic region 14. The sixth magnetic region 16 is provided between the seventh magnetic region 17 and the fifth magnetic region 15.

A ratio (Pt/Co) of the seventh Pt atomic concentration in the seventh magnetic region 17 to the seventh Co atomic concentration in the seventh magnetic region 17 is defined as a seventh composition ratio R7. The seventh composition ratio R7 is higher than the sixth composition ratio R6. The fifth composition ratio R5 is higher than the sixth composition ratio R6. For example, in the plurality of magnetic regions, the composition ratio (Pt/Co) alternately increases and decreases.

An anisotropic magnetic field in the seventh magnetic region 17 is referred to as a seventh anisotropic magnetic field Hk7. For example, the seventh anisotropic magnetic field Hk7 is larger than the sixth anisotropic magnetic field Hk6. For example, in the plurality of magnetic regions, the anisotropic magnetic field alternately increases and decreases. A high areal recording density ADC can also be obtained in the magnetic recording medium 80F.

In the magnetic recording medium 80F, a distance between the sixth magnetic region 16 and the seventh magnetic region 17 is defined as a sixth distance L6. The fifth distance L5 may be, for example, 10 nm or less.

The configurations of the magnetic recording medium 80A to 80D may be applied to the magnetic recording medium 80E and the magnetic recording medium 80F.

Figure 10:
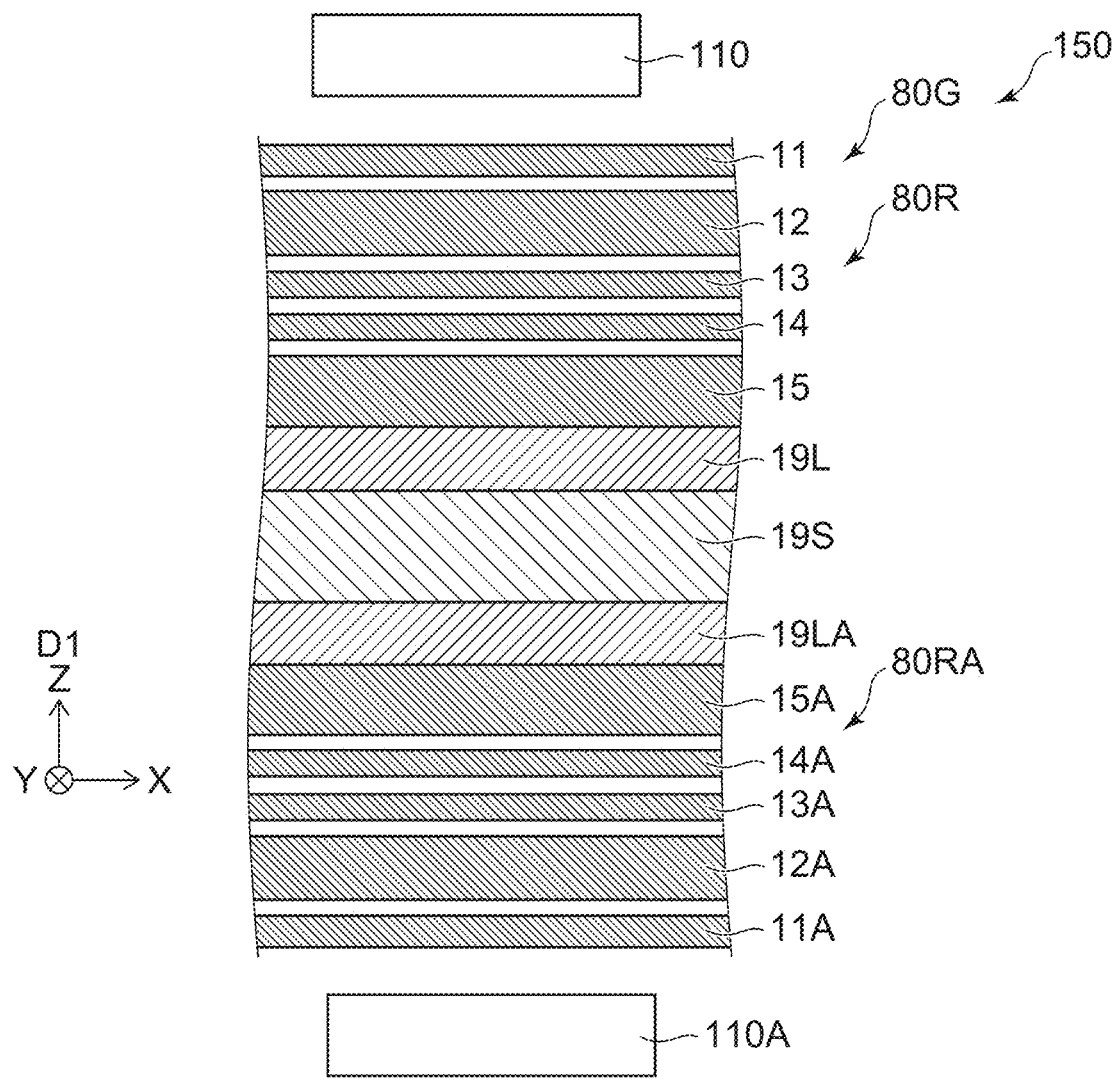
FIG. 10 is a schematic cross-sectional view illustrating a magnetic recording medium according to the first embodiment.

FIG. 10 is a schematic cross-sectional view illustrating a magnetic recording medium according to the first embodiment.

As shown in FIG. 10, in a magnetic recording medium 80G according to the embodiment, another recording layer 80RA is provided in addition to the above recording layer 80R. The configuration of the magnetic recording medium 80G except for this may be the same as the configuration of any of the above-mentioned magnetic recording media.

The nonmagnetic substrate 19S is provided between another recording layer 80RA and the recording layer 80R. Another recording layer 80RA includes another first magnetic region 11A, another second magnetic region 12A, another third magnetic region 13A, another fourth magnetic region 14A, and another fifth magnetic region 15A.

The nonmagnetic substrate 19S is provided between the other first magnetic region 11A and the first magnetic region 11. The other second magnetic region 12A is provided between the other first magnetic region 11A and the nonmagnetic substrate 19S. The other third magnetic region 13A is provided between the other second magnetic region 12A and the nonmagnetic substrate 19S. The other fourth magnetic region 14A is provided between the other third magnetic region 13A and the nonmagnetic substrate 19S. The other fifth magnetic region 15A is provided between the other fourth magnetic region 14A and the nonmagnetic substrate 19S. The other intermediate layer 19LA may be provided between the other fifth magnetic region 15A and the nonmagnetic substrate 19S.

The other first magnetic region 11A, the other second magnetic region 12A, the other third magnetic region 13A, the other fourth magnetic region 14A, and the other fifth magnetic region 15A may have the configuration of the first magnetic region 11, the second magnetic region 12, the third magnetic region 13, the fourth magnetic region 14, and the fifth magnetic region 15, respectively.

In the magnetic recording medium 80G, the recording layer is provided on each of the two faces of the nonmagnetic substrate 19S. The other magnetic head 110A opposes the other first magnetic region 11A.

Second Embodiment

The second embodiment relates to the magnetic recording device 150.

Figure 11:
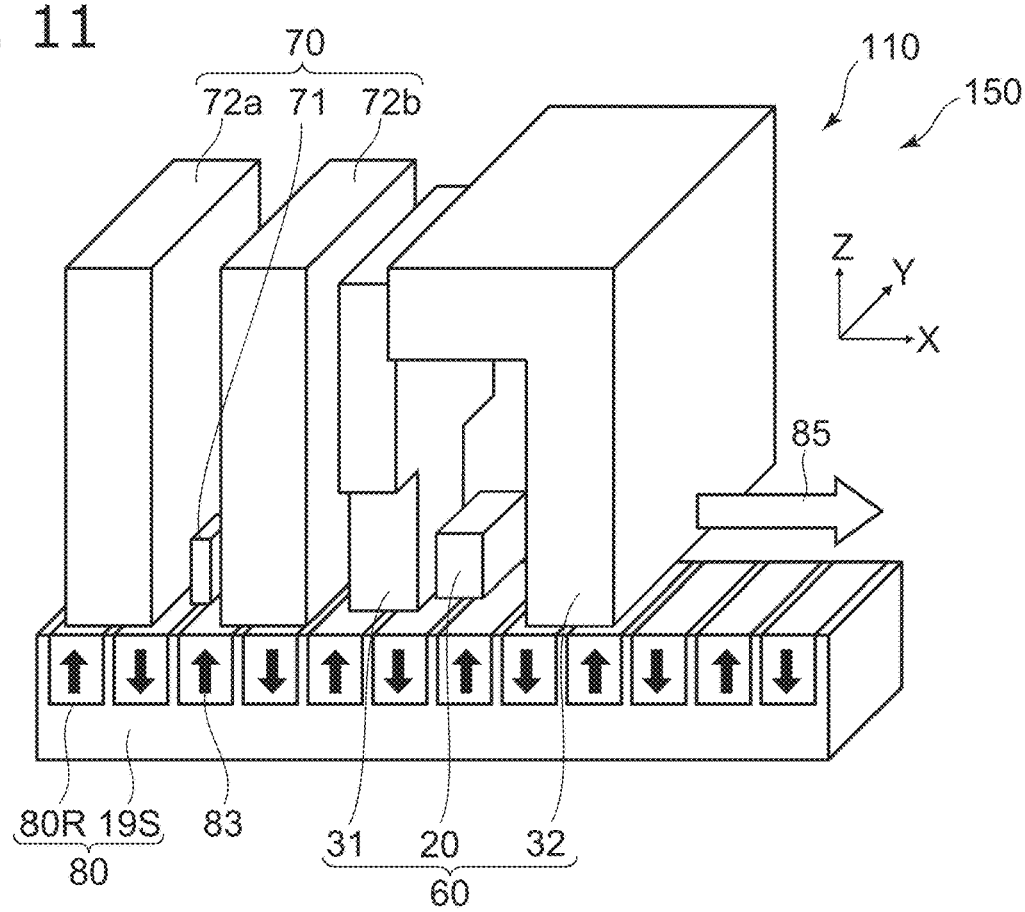
FIG. 11 is a schematic perspective view illustrating the magnetic recording device according to a second embodiment.

FIG. 11 is a schematic perspective view illustrating the magnetic recording device according to the second embodiment.

As shown in FIG. 11, the magnetic head 110 is used together with the magnetic recording medium (for example, the magnetic recording medium 80, etc.) according to the first embodiment. In this example, the magnetic head 110 includes a recording section 60 and the reproducing section 70. Information is recorded on the magnetic recording medium 80 by the recording unit 60 of the magnetic head 110. The reproducing section 70 reproduces information recorded on the magnetic recording medium 80.

The magnetic recording medium 80 includes, for example, the nonmagnetic substrate 19S and the recording layer 80R provided on the nonmagnetic substrate 19S. The magnetization 83 of the recording layer 80R is controlled by the recording section 60.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal according to the magnetization 83 of the recording layer 80R.

As shown in FIG. 11, the magnetic recording medium 80 moves relative to the magnetic head 110 in a medium movement direction 85. The magnetic head 110 controls information corresponding to the magnetization 83 of the recording layer 80R at an arbitrary position. The magnetic head 110 reproduces information corresponding to the magnetization 83 of the recording layer 80R at an arbitrary position.

In the magnetic recording device 150, the magnetic head 110 faces the recording layer 80R (see FIG. 1). The magnetic head 110 is configured to perform the recording operation. In the recording operation, an alternating magnetic field is applied from the magnetic head 110 to the magnetic recording medium 80 (recording layer 80R).

Figure 12:
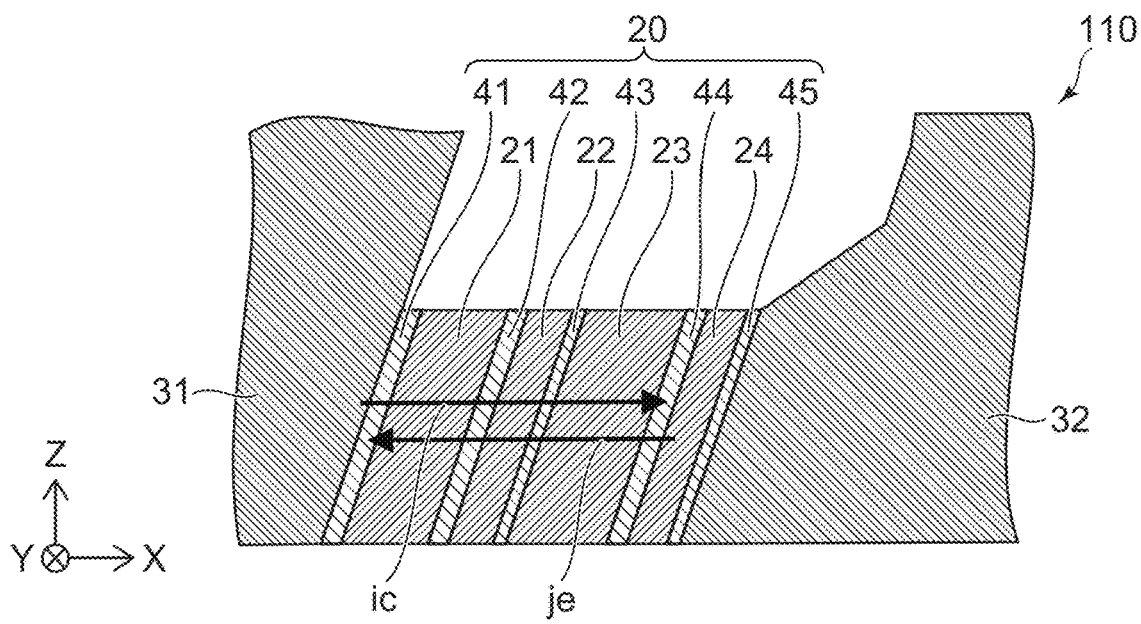
FIG. 12 is a schematic cross-sectional view illustrating a part of the magnetic recording device according to the second embodiment.

FIG. 12 is a schematic cross-sectional view illustrating a part of the magnetic recording device according to the second embodiment.

FIG. 12 illustrates the magnetic head 110. The magnetic head 110 includes a first magnetic pole 31, a second magnetic pole 32, and a magnetic element 20. The magnetic element 20 is provided between the first magnetic pole 31 and the second magnetic pole 32.

For example, the magnetic element 20 includes a first magnetic layer 21, a second magnetic layer 22, a third magnetic layer 23, and a fourth magnetic layer 24. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

For example, the magnetic element 20 includes a first nonmagnetic layer 41, a second nonmagnetic layer 42, a third nonmagnetic layer 43, a fourth nonmagnetic layer 44, and a fifth nonmagnetic layer 45. The first nonmagnetic layer 41 is provided between the first magnetic pole 31 and the first magnetic layer 21. The second nonmagnetic layer 42 is provided between the first magnetic layer 21 and the second magnetic layer 22. The third nonmagnetic layer 43 is provided between the second magnetic layer 22 and the third magnetic layer 23. The fourth nonmagnetic layer 44 is provided between the third magnetic layer 23 and the fourth magnetic layer 24. The fifth nonmagnetic layer 45 is provided between the fourth magnetic layer 24 and the second magnetic pole 32.

In one example, the first nonmagnetic layer 41 includes at least one selected from the group consisting of Cu, Au, Cr, V, Al, and Ag. The second nonmagnetic layer 42 includes at least one selected from the group consisting of Ru, Ir, Ta, Rh, Pd, Pt, and W. The third nonmagnetic layer 43 includes at least one selected from the group consisting of Cu, Au, Cr, V, Al, and Ag. The fourth nonmagnetic layer 44 includes at least one selected from the group consisting of Cu, Au, Cr, V, Al, and Ag. The fifth nonmagnetic layer 45 includes at least one selected from the group consisting of Ru, Ir, Ta, Rh, Pd, Pt, and W. In such a configuration, for example, it is easy to obtain a stable alternating magnetic field.

As shown in FIG. 12, in the recording operation, a current ic is supplied to the magnetic element 20. The current ic flows from the first magnetic pole 31 to the second magnetic pole 32. The electron current je flows from the second magnetic pole 32 to the first magnetic pole 31.

Figure 13:
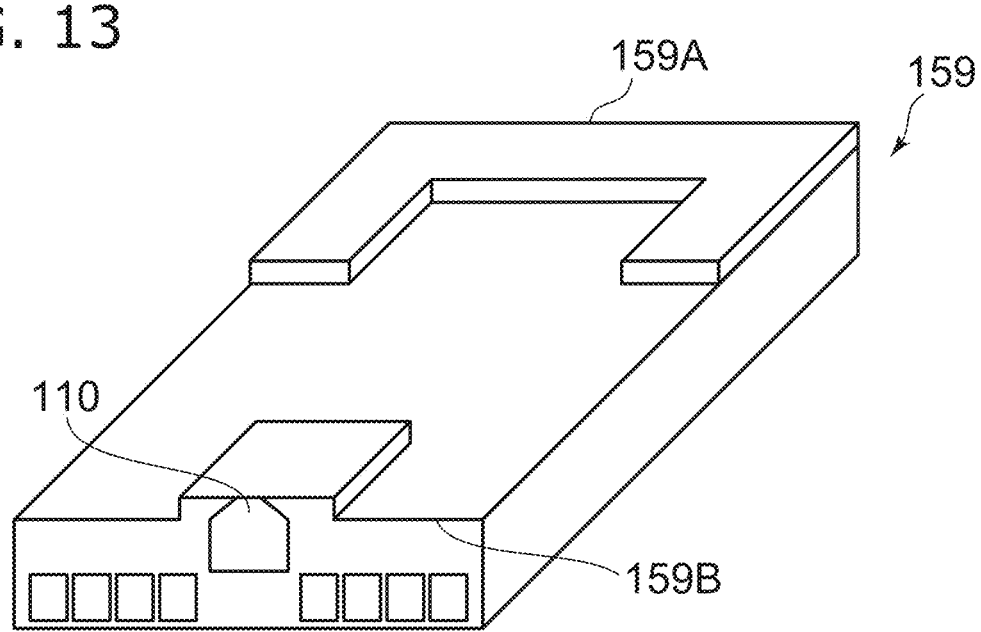
FIG. 13 is a schematic perspective view illustrating a part of the magnetic recording device according to the embodiment.

FIG. 13 is a schematic perspective view illustrating a part of the magnetic recording device according to the embodiment.

FIG. 13 illustrates a head slider.

The magnetic head 110 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 14:
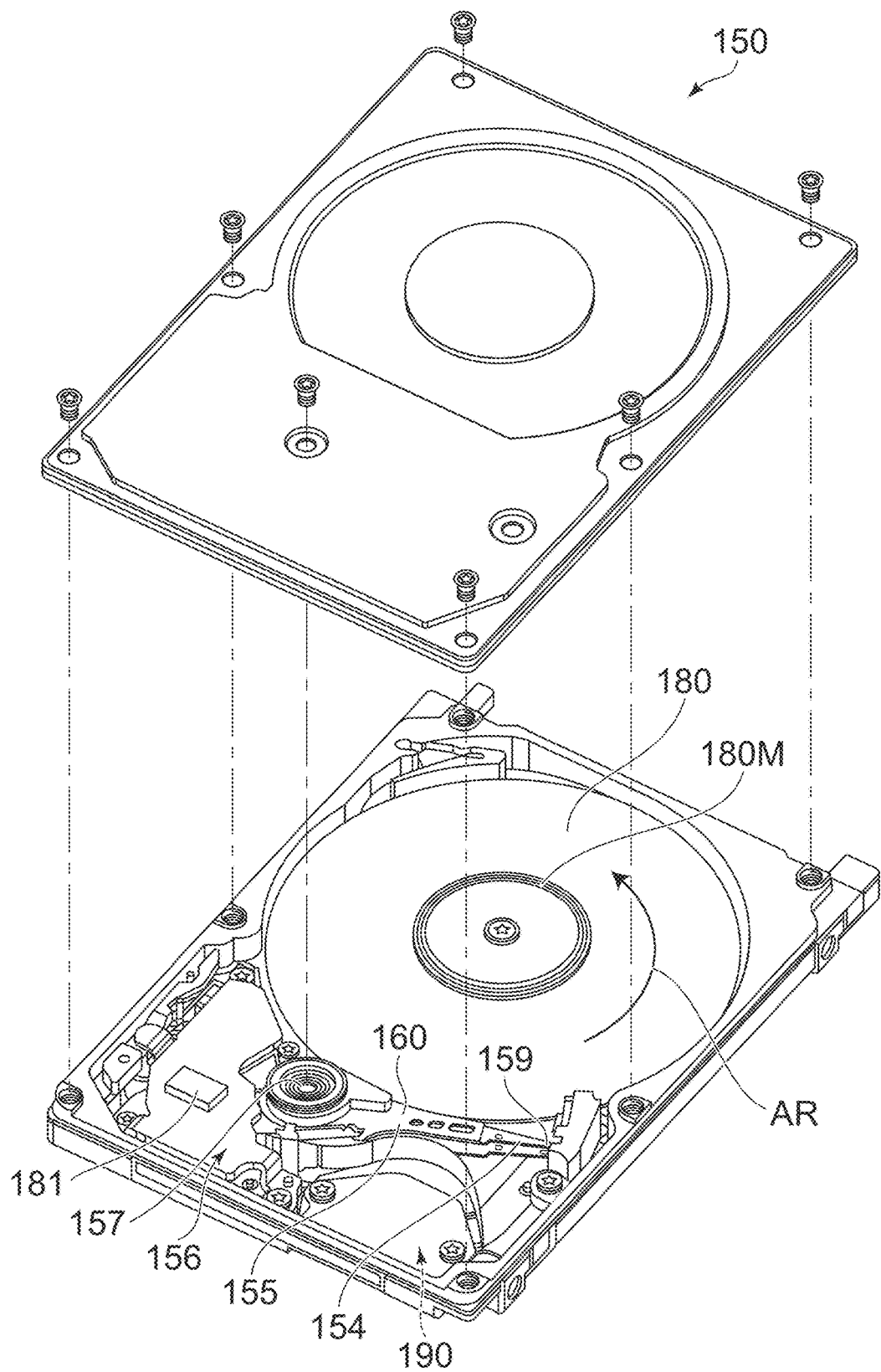
FIG. 14 is a schematic perspective view illustrating the magnetic recording device according to the embodiment.

FIG. 14 is a schematic perspective view illustrating the magnetic recording device according to the embodiment.

Figure 15A:
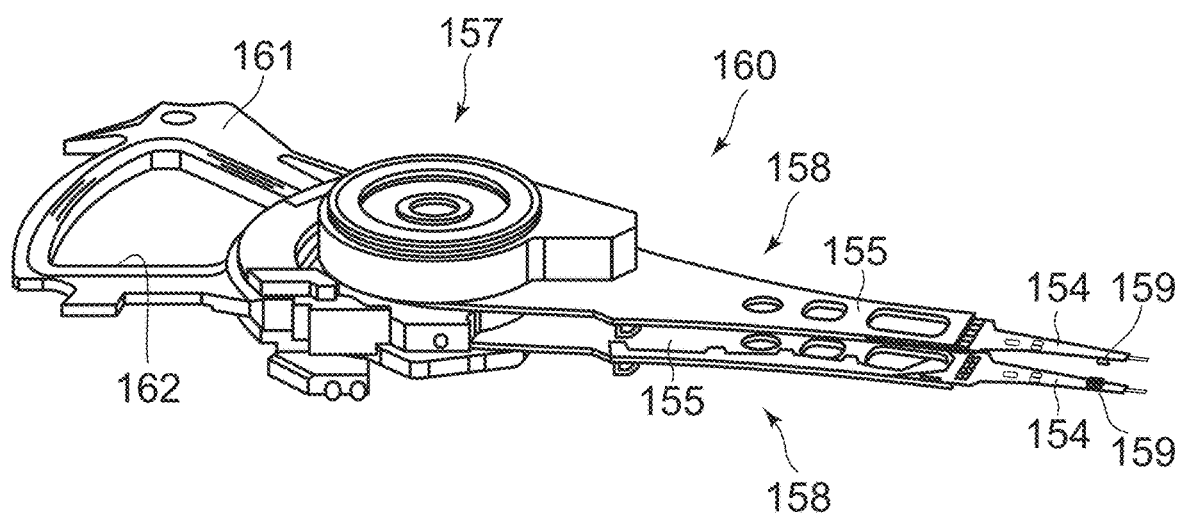
FIGS. 15A and 15B are schematic perspective views illustrating a part of the magnetic recording device according to the embodiment.
Figure 15B:
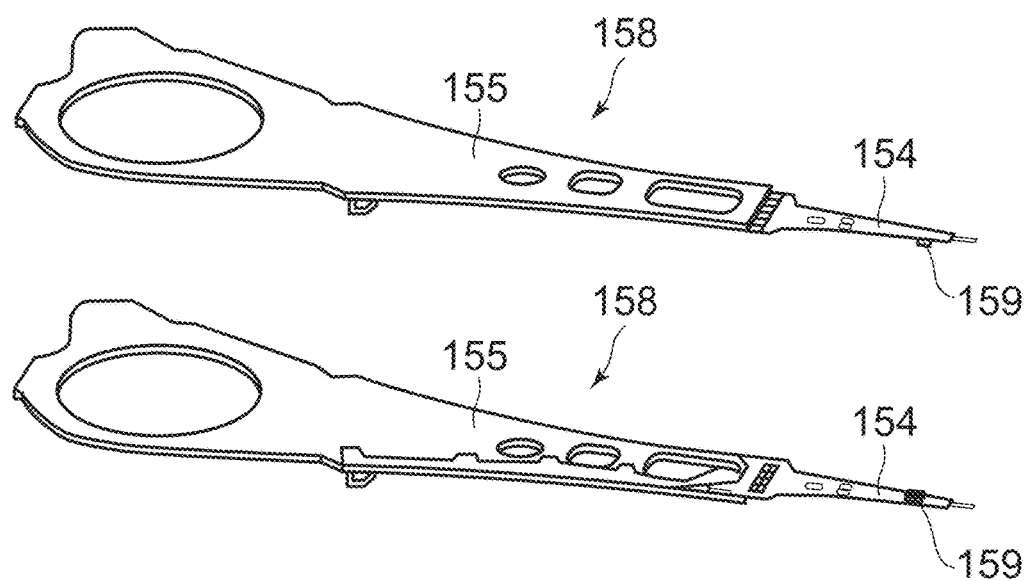

FIGS. 15A and 15B are schematic perspective views illustrating a part of the magnetic recording device according to the embodiment.

The magnetic recording device may be a magnetic recording/reproducing device. As shown in FIG. 14, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 15A is an enlarged perspective view of the head stack assembly 160, illustrating the configuration of a part of the magnetic recording device.

FIG. 15B is a perspective view illustrating the magnetic head assembly (head gimbal assembly: HGA) 158 that forms part of the head stack assembly 160.

As shown in FIG. 15A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 15B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following Configurations (for example, technical proposals).

(Configuration 1)

A magnetic recording medium, comprising:
a first magnetic region;
a second magnetic region;
a third magnetic region;
a fourth magnetic region; and
a fifth magnetic region,
the second magnetic region being provided between the fifth magnetic region and the first magnetic region in a first direction from the fifth magnetic region to the first magnetic region,
the third magnetic region being provided between the fifth magnetic region and the second magnetic region in the first direction,
the fourth magnetic region being provided between the fifth magnetic region and the third magnetic region in the first direction,
a first composition ratio of a first Pt atomic concentration in the first magnetic region to a first Co atomic concentration in the first magnetic region being higher than a second composition ratio of a second Pt atomic concentration in the second magnetic region to a second Co atomic concentration in the second magnetic region,
a third composition ratio of the third Pt atomic concentration in the third magnetic region to the third Co atomic concentration in the third magnetic region being higher than the second composition ratio, and higher than a fourth composition ratio of a fourth Pt atomic concentration in the fourth magnetic region to a fourth Co atomic concentration in the fourth magnetic region, and
a fifth composition ratio of a fifth Pt atomic concentration in the fifth magnetic region to a fifth Co atomic concentration in the fifth magnetic region being higher than the fourth composition ratio.

(Configuration 2)

The magnetic recording medium according to Configuration 1, wherein
a first anisotropic magnetic field of the first magnetic region is larger than a second anisotropic magnetic field of the second magnetic region,
the second anisotropic magnetic field is smaller than a third anisotropic magnetic field of the third magnetic region,
the third anisotropic magnetic field is larger than a fourth anisotropic magnetic field of the fourth magnetic region, and
the fourth anisotropic magnetic field is smaller than a fifth anisotropic magnetic field of the fifth magnetic region.

(Configuration 3)

A magnetic recording medium, comprising:
a first magnetic region;
a second magnetic region;
a third magnetic region;
a fourth magnetic region; and
a fifth magnetic region,
the second magnetic region being provided between the fifth magnetic region and the first magnetic region in a first direction from the fifth magnetic region to the first magnetic region, the third magnetic region being provided between the fifth magnetic region and the second magnetic region in the first direction, the fourth magnetic region being provided between the fifth magnetic region and the third magnetic region in the first direction, a first anisotropic magnetic field of the first magnetic region being larger than a second anisotropic magnetic field of the second magnetic region, the second anisotropic magnetic field being smaller than a third anisotropic magnetic field of the third magnetic region, the third anisotropic magnetic field being larger than a fourth anisotropic magnetic field of the fourth magnetic region, and the fourth anisotropic magnetic field being smaller than a fifth anisotropic magnetic field of the fifth magnetic region.

(Configuration 4)

The magnetic recording medium according to any one of Configurations 1-3, wherein a first magnetic region thickness of the first magnetic region along the first direction is thinner than a second magnetic region thickness of the second magnetic region along the first direction, a third magnetic region thickness of the third magnetic region along the first direction is thinner than the second magnetic region thickness, a fourth magnetic region thickness of the fourth magnetic region along the first direction is thinner than the second magnetic region thickness, the first magnetic region thickness is thinner than a fifth magnetic region thickness of the fifth magnetic region along the first direction, the third magnetic region thickness is thinner than the fifth magnetic region thickness, and the fourth magnetic region thickness is thinner than the fifth magnetic region thickness.

(Configuration 5)

The magnetic recording medium according to Configuration 4, wherein the first magnetic region thickness is 0.5 times or less than the second magnetic region thickness, the third magnetic region thickness is 0.5 times or less than the thickness of the second magnetic region, the fourth magnetic region thickness is 0.5 times or less than the thickness of the second magnetic region, the first magnetic region thickness is 0.5 times or less than the fifth magnetic region thickness, the third magnetic region thickness is 0.5 times or less than the fifth magnetic region thickness, and the fourth magnetic region thickness is 0.5 times or less the thickness of the fifth magnetic region.

(Configuration 6)

The magnetic recording medium according to Configuration 4 or 5, further comprising:

a first nonmagnetic region provided between the first magnetic region and the second magnetic region;

a second nonmagnetic region provided between the second magnetic region and the third magnetic region;

a third nonmagnetic region provided between the third magnetic region and the fourth magnetic region; and a fourth nonmagnetic region provided between the fourth magnetic region and the fifth magnetic region, a first nonmagnetic region thickness of the first nonmagnetic region along the first direction being thicker than a second nonmagnetic region thickness of the second nonmagnetic region along the first direction, the second nonmagnetic region thickness being thinner than a third nonmagnetic region thickness of the third nonmagnetic region along the first direction.

(Configuration 7)

The magnetic recording medium according to Configuration 6, wherein a ratio of the first nonmagnetic region thickness to the second nonmagnetic region thickness is higher than 2, a ratio of the second nonmagnetic region thickness to the third nonmagnetic region thickness is lower than 0.5, and a ratio of the third nonmagnetic region thickness to a fourth nonmagnetic region thickness of the fourth nonmagnetic region along the first direction is higher than 0.5 and lower than 2.

(Configuration 8)

The magnetic recording medium according to Configuration 7, wherein the first nonmagnetic region contacts the first magnetic region and the second magnetic region, the second nonmagnetic region contacts the second magnetic region and the third magnetic region, the third nonmagnetic region contacts the third magnetic region and the fourth magnetic region, and the fourth nonmagnetic region contacts the fourth magnetic region and the fifth magnetic region.

(Configuration 9)

The magnetic recording medium according to any one of Configurations 6-8, wherein at least one of the first nonmagnetic region, the second nonmagnetic region, the third nonmagnetic region or the fourth nonmagnetic region includes at least one selected from the group consisting of Ru, Pt and C.

(Configuration 10)

The magnetic recording medium according to Configuration 4 or 5, further comprising:

a first nonmagnetic region provided between the first magnetic region and the second magnetic region;

a second nonmagnetic region provided between the second magnetic region and the third magnetic region;

a third nonmagnetic region provided between the third magnetic region and the fourth magnetic region; and a fourth nonmagnetic region provided between the fourth magnetic region and the fifth magnetic region, a first nonmagnetic region thickness of the first nonmagnetic region along the first direction being thicker than a second nonmagnetic region thickness of the second nonmagnetic region along the first direction, a third nonmagnetic region thickness of the third nonmagnetic region along the first direction being not less than 0.8 times and not more than 1.2 times a fourth nonmagnetic region thickness of the fourth nonmagnetic region along the first direction.

(Configuration 11)

The magnetic recording medium according to Configuration 10, wherein a ratio of the first nonmagnetic region thickness to the second nonmagnetic region thickness is higher than 2.

(Configuration 12)

The magnetic recording medium according to Configuration 4 or 5, further comprising:

a first nonmagnetic region provided between the first magnetic region and the second magnetic region;

a second continuous magnetic region provided between the second magnetic region and the third magnetic region;

a third nonmagnetic region provided between the third magnetic region and the fourth magnetic region; and a fourth nonmagnetic region provided between the fourth magnetic region and the fifth magnetic region, the second magnetic region and the third magnetic region being granular magnetic regions.

(Configuration 13)

The magnetic recording medium according to Configuration 12, wherein the second continuous magnetic region does not include Si, or a concentration of Si in the second continuous magnetic region is lower than a concentration of Si in the second magnetic region and the third magnetic region.

(Configuration 14)

The magnetic recording medium according to any one of Configurations 1-13, wherein at least one of the first magnetic region, the second magnetic region, the third magnetic region, the fourth magnetic region, or the fifth magnetic region includes a plurality of partial regions arranged the first direction, and a dispersion of an anisotropic magnetic field in the plurality of partial regions is 20% or less.

(Configuration 15)

The magnetic recording medium according to any one of Configurations 1-14, wherein a first distance between the first magnetic region and the second magnetic region is 10 nm or less, a second distance between the second magnetic region and the third magnetic region is 10 nm or less, a third distance between the third magnetic region and the fourth magnetic region is 10 nm or less, and a fourth distance between the fourth magnetic region and the fifth magnetic region is 10 nm or less.

(Configuration 16)

The magnetic recording medium according to any one of Configuration 1 or 2, further comprising:

a sixth magnetic region; and a seventh magnetic region, the fifth magnetic region being provided between the seventh magnetic region and the fourth magnetic region, the sixth magnetic region being provided between the seventh magnetic region and the fifth magnetic region, a seventh composition ratio of a seventh Pt atom concentration in the seventh magnetic region to a seventh Co atom concentration in the seventh magnetic region being higher than a sixth composition ratio of a sixth Pt atomic concentration in the sixth magnetic region to a sixth Co atomic concentration in the sixth magnetic region, and the fifth composition ratio being higher than the sixth composition ratio.

(Configuration 17)

The magnetic recording medium according to any one of Configurations 1-16, wherein an overall average anisotropic magnetic field of the magnetic recording medium is not less than 17.5 kOe and not more than 19.5 kOe.

(Configuration 18)

The magnetic recording medium according to any one of Configurations 1-16, wherein an overall average saturation magnetization of the magnetic recording medium is not less than 850 emu/cc and not more than 1050 emu/cc.

(Configuration 19)

A magnetic recording device, comprising:

the magnetic recording medium according to any one of Configurations 1-18; and a magnetic head, the first magnetic region being located between the fifth magnetic region and the magnetic head.

(Configuration 20)

The magnetic recording device according to Configuration 19, wherein the magnetic head is configured to perform a recording operation, and in the recording operation, an alternating magnetic field is applied from the magnetic head to the magnetic recording medium, and a recording magnetic field is applied from the magnetic head to the magnetic recording medium.

According to the embodiment, a magnetic recording medium and a magnetic recording device that can improve recording density can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording media, such as magnetic regions, nonmagnetic regions, continuous magnetic regions, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording media and all magnetic recording devices practicable by an appropriate design modification by one skilled in the art based on the magnetic recording media and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording medium, comprising:
   a first magnetic region;
   a second magnetic region;
   a third magnetic region;
   a fourth magnetic region; and
   a fifth magnetic region,
   the second magnetic region being provided between the fifth magnetic region and the first magnetic region in a first direction from the fifth magnetic region to the first magnetic region,
   the third magnetic region being provided between the fifth magnetic region and the second magnetic region in the first direction,
   the fourth magnetic region being provided between the fifth magnetic region and the third magnetic region in the first direction,
   a first composition ratio of a first Pt atomic concentration in the first magnetic region to a first Co atomic concentration in the first magnetic region being higher than a second composition ratio of a second Pt atomic concentration in the second magnetic region to a second Co atomic concentration in the second magnetic region,
   a third composition ratio of a third Pt atomic concentration in the third magnetic region to a third Co atomic concentration in the third magnetic region being higher than the second composition ratio, and higher than a fourth composition ratio of a fourth Pt atomic concentration in the fourth magnetic region to a fourth Co atomic concentration in the fourth magnetic region, and
   a fifth composition ratio of a fifth Pt atomic concentration in the fifth magnetic region to a fifth Co atomic concentration in the fifth magnetic region being higher than the fourth composition ratio.

2. The magnetic recording medium according to claim 1, wherein
   a first anisotropic magnetic field of the first magnetic region is larger than a second anisotropic magnetic field of the second magnetic region,
   the second anisotropic magnetic field is smaller than a third anisotropic magnetic field of the third magnetic region,
   the third anisotropic magnetic field is larger than a fourth anisotropic magnetic field of the fourth magnetic region, and
   the fourth anisotropic magnetic field is smaller than a fifth anisotropic magnetic field of the fifth magnetic region.

3. The magnetic recording medium according to claim 1, wherein
   a first magnetic region thickness of the first magnetic region along the first direction is thinner than a second magnetic region thickness of the second magnetic region along the first direction,
   a third magnetic region thickness of the third magnetic region along the first direction is thinner than the second magnetic region thickness,
   a fourth magnetic region thickness of the fourth magnetic region along the first direction is thinner than the second magnetic region thickness,
   the first magnetic region thickness is thinner than a fifth magnetic region thickness of the fifth magnetic region along the first direction,
   the third magnetic region thickness is thinner than the fifth magnetic region thickness, and
   the fourth magnetic region thickness is thinner than the fifth magnetic region thickness.

4. The magnetic recording medium according to claim 3, wherein
   the first magnetic region thickness is 0.5 times or less than the second magnetic region thickness,
   the third magnetic region thickness is 0.5 times or less than the thickness of the second magnetic region,
   the fourth magnetic region thickness is 0.5 times or less than the thickness of the second magnetic region,
   the first magnetic region thickness is 0.5 times or less than the fifth magnetic region thickness,
   the third magnetic region thickness is 0.5 times or less than the fifth magnetic region thickness, and
   the fourth magnetic region thickness is 0.5 times or less the thickness of the fifth magnetic region.

5. The magnetic recording medium according to claim 3, further comprising:
   a first nonmagnetic region provided between the first magnetic region and the second magnetic region;
   a second nonmagnetic region provided between the second magnetic region and the third magnetic region;
   a third nonmagnetic region provided between the third magnetic region and the fourth magnetic region; and
   a fourth nonmagnetic region provided between the fourth magnetic region and the fifth magnetic region,
   a first nonmagnetic region thickness of the first nonmagnetic region along the first direction being thicker than a second nonmagnetic region thickness of the second nonmagnetic region along the first direction,
   the second nonmagnetic region thickness being thinner than a third nonmagnetic region thickness of the third nonmagnetic region along the first direction.

6. The magnetic recording medium according to claim 5, wherein
   a ratio of the first nonmagnetic region thickness to the second nonmagnetic region thickness is higher than 2,
   a ratio of the second nonmagnetic region thickness to the third nonmagnetic region thickness is lower than 0.5, and
   a ratio of the third nonmagnetic region thickness to a fourth nonmagnetic region thickness of the fourth nonmagnetic region along the first direction is higher than 0.5 and lower than 2.

7. The magnetic recording medium according to claim 6, wherein
   the first nonmagnetic region contacts the first magnetic region and the second magnetic region,
   the second nonmagnetic region contacts the second magnetic region and the third magnetic region,
   the third nonmagnetic region contacts the third magnetic region and the fourth magnetic region, and
   the fourth nonmagnetic region contacts the fourth magnetic region and the fifth magnetic region.

8. The magnetic recording medium according to claim 5, wherein
   at least one of the first nonmagnetic region, the second nonmagnetic region, the third nonmagnetic region or the fourth nonmagnetic region includes at least one selected from the group consisting of Ru, Pt and C.

9. The magnetic recording medium according to claim 3, further comprising:
   a first nonmagnetic region provided between the first magnetic region and the second magnetic region;
   a second nonmagnetic region provided between the second magnetic region and the third magnetic region;
   a third nonmagnetic region provided between the third magnetic region and the fourth magnetic region; and a fourth nonmagnetic region provided between the fourth magnetic region and the fifth magnetic region, a first nonmagnetic region thickness of the first nonmagnetic region along the first direction being thicker than a second nonmagnetic region thickness of the second nonmagnetic region along the first direction, a third nonmagnetic region thickness of the third nonmagnetic region along the first direction being not less than 0.8 times and not more than 1.2 times a fourth nonmagnetic region thickness of the fourth nonmagnetic region along the first direction.

10. The magnetic recording medium according to claim 9, wherein a ratio of the first nonmagnetic region thickness to the second nonmagnetic region thickness is higher than 2.

11. The magnetic recording medium according to claim 3, further comprising:

a first nonmagnetic region provided between the first magnetic region and the second magnetic region;

a second continuous magnetic region provided between the second magnetic region and the third magnetic region;

a third nonmagnetic region provided between the third magnetic region and the fourth magnetic region; and a fourth nonmagnetic region provided between the fourth magnetic region and the fifth magnetic region, the second magnetic region and the third magnetic region being granular magnetic regions.

12. The magnetic recording medium according to claim 11, wherein the second continuous magnetic region does not include Si, or a concentration of Si in the second continuous magnetic region is lower than a concentration of Si in the second magnetic region and the third magnetic region.

13. The magnetic recording medium according to claim 1, wherein at least one of the first magnetic region, the second magnetic region, the third magnetic region, the fourth magnetic region, or the fifth magnetic region includes a plurality of partial regions arranged along the first direction, and a dispersion of an anisotropic magnetic field in the plurality of partial regions is 20% or less.

14. The magnetic recording medium according to claim 1, wherein a first distance between the first magnetic region and the second magnetic region is 10 nm or less, a second distance between the second magnetic region and the third magnetic region is 10 nm or less, a third distance between the third magnetic region and the fourth magnetic region is 10 nm or less, and a fourth distance between the fourth magnetic region and the fifth magnetic region is 10 nm or less.

15. The magnetic recording medium according to claim 1, further comprising:

a sixth magnetic region; and a seventh magnetic region, the fifth magnetic region being provided between the seventh magnetic region and the fourth magnetic region, the sixth magnetic region being provided between the seventh magnetic region and the fifth magnetic region, a seventh composition ratio of a seventh Pt atomic concentration in the seventh magnetic region to a seventh Co atomic concentration in the seventh magnetic region being higher than a sixth composition ratio of a sixth Pt atomic concentration in the sixth magnetic region to a sixth Co atomic concentration in the sixth magnetic region, and the fifth composition ratio being higher than the sixth composition ratio.

16. The magnetic recording medium according to claim 1, wherein an overall average anisotropic magnetic field of the magnetic recording medium is not less than 17.5 kOe and not more than 19.5 kOe.

17. The magnetic recording medium according to claim 1, wherein an overall average saturation magnetization of the magnetic recording medium is not less than 850 emu/cc and not more than 1050 emu/cc.

18. A magnetic recording device, comprising:

the magnetic recording medium according to claim 1; and a magnetic head, the first magnetic region being located between the fifth magnetic region and the magnetic head.

19. The magnetic recording device according to claim 18, wherein the magnetic head is configured to perform a recording operation, and in the recording operation, an alternating magnetic field is applied from the magnetic head to the magnetic recording medium, and a recording magnetic field is applied from the magnetic head to the magnetic recording medium.

20. A magnetic recording medium, comprising:

a first magnetic region;

a second magnetic region;

a third magnetic region;

a fourth magnetic region; and a fifth magnetic region, the second magnetic region being provided between the fifth magnetic region and the first magnetic region in a first direction from the fifth magnetic region to the first magnetic region, the third magnetic region being provided between the fifth magnetic region and the second magnetic region in the first direction, the fourth magnetic region being provided between the fifth magnetic region and the third magnetic region in the first direction, a first anisotropic magnetic field of the first magnetic region being larger than a second anisotropic magnetic field of the second magnetic region, the second anisotropic magnetic field being smaller than a third anisotropic magnetic field of the third magnetic region, the third anisotropic magnetic field being larger than a fourth anisotropic magnetic field of the fourth magnetic region, and the fourth anisotropic magnetic field being smaller than a fifth anisotropic magnetic field of the fifth magnetic region.

* * * * *